United States Patent
Genner et al.

(10) Patent No.: US 11,967,173 B1
(45) Date of Patent: Apr. 23, 2024

(54) FACE COVER-COMPATIBLE BIOMETRICS AND PROCESSES FOR GENERATING AND USING SAME

(71) Applicant: T Stamp Inc., Atlanta, GA (US)

(72) Inventors: Gareth Neville Genner, Atlanta, GA (US); Norman Hoon Thian Poh, Atlanta, GA (US)

(73) Assignee: T Stamp Inc., Atlanta, GA (US)

( * ) Notice: Subject to any disclaimer, the term of this patent is extended or adjusted under 35 U.S.C. 154(b) by 231 days.

(21) Appl. No.: 17/324,544

(22) Filed: May 19, 2021

Related U.S. Application Data

(60) Provisional application No. 63/027,072, filed on May 19, 2020.

(51) Int. Cl.
*G06V 40/16* (2022.01)
*G06T 19/00* (2011.01)
*G06V 40/50* (2022.01)

(52) U.S. Cl.
CPC ............ *G06V 40/161* (2022.01); *G06T 19/00* (2013.01); *G06V 40/171* (2022.01); *G06V 40/172* (2022.01); *G06V 40/50* (2022.01); *G06T 2210/22* (2013.01)

(58) Field of Classification Search
CPC .. G06V 40/161; G06V 40/171; G06V 40/172; G06V 40/50; G06T 19/00; G06T 2210/22
See application file for complete search history.

(56) References Cited

U.S. PATENT DOCUMENTS

| | | | |
|---|---|---|---|
| 6,836,554 | B1 | 12/2004 | Bolle et al. |
| 7,120,607 | B2 | 10/2006 | Bolle et al. |
| 7,412,081 | B2 | 8/2008 | Doi |
| 7,773,784 | B2 | 8/2010 | Boult |
| 7,822,631 | B1 | 10/2010 | Vander Mey et al. |
| 8,010,460 | B2 | 8/2011 | Work et al. |
| 8,249,314 | B2 | 8/2012 | Bolle et al. |
| 8,312,291 | B2 | 11/2012 | Golic et al. |
| 8,316,086 | B2 | 11/2012 | Ufford et al. |

(Continued)

FOREIGN PATENT DOCUMENTS

| | | |
|---|---|---|
| CN | 103930921 A | 7/2014 |
| EP | 3065366 A1 | 9/2016 |

(Continued)

OTHER PUBLICATIONS

Rathgeb et al., "Unlinkable Improved Multi-biometric Iris Fuzzy Vault", EURASIP Journal on Information Security, 2016, 2016:26.

(Continued)

*Primary Examiner* — Wesley J Tucker
(74) *Attorney, Agent, or Firm* — Morris, Manning & Martin, LLP; Daniel E. Sineway, Esq.

(57) ABSTRACT

A system for biometric enrollment can include a server including a processor configured to receive an uncovered face image of a subject. The processor can generate a first fixed-size representation (FXR) based on the uncovered face image and a covered face image based on the uncovered face image. The processor can generate a second FXR based on the covered face image. The processor can enroll the subject associated with the uncovered face image by storing the first FXR and the second FXR in a data store.

20 Claims, 9 Drawing Sheets

(56) References Cited

U.S. PATENT DOCUMENTS

| | | |
|---|---|---|
| 8,457,367 B1 | 6/2013 | Sipe et al. |
| 8,510,797 B2 | 8/2013 | Kasturi |
| 8,542,879 B1 | 9/2013 | Nechyba et al. |
| 8,675,926 B2 | 3/2014 | Zhang et al. |
| 8,724,856 B1 | 5/2014 | King |
| 8,965,066 B1 | 2/2015 | Derakhshani et al. |
| 9,070,088 B1 | 6/2015 | Baveja et al. |
| 9,147,117 B1 | 9/2015 | Madhu et al. |
| 9,173,101 B1 | 10/2015 | Angelov et al. |
| 9,262,725 B2 | 2/2016 | Butte et al. |
| 9,300,676 B2 | 3/2016 | Madhu et al. |
| 9,477,828 B2 | 10/2016 | Irie |
| 9,495,588 B2 | 11/2016 | Derakhshani et al. |
| 9,521,606 B1 | 12/2016 | Costa et al. |
| 9,652,663 B2 | 5/2017 | Lau et al. |
| 9,679,212 B2 | 6/2017 | Kim et al. |
| 9,721,147 B1 | 8/2017 | Kapczynski |
| 9,838,388 B2 | 12/2017 | Mather et al. |
| 9,866,393 B1 | 1/2018 | Rush et al. |
| 10,019,561 B1 | 7/2018 | Shelton et al. |
| 10,049,287 B2 | 8/2018 | Holz et al. |
| 10,210,388 B2 | 2/2019 | Derakhshani et al. |
| 10,225,255 B1 | 3/2019 | Jampani et al. |
| 10,275,684 B2 | 4/2019 | Han et al. |
| 10,320,569 B1 | 6/2019 | Wentz et al. |
| 10,430,638 B2 | 10/2019 | Russo |
| 10,594,688 B2 | 3/2020 | Yang et al. |
| 10,628,700 B2 | 4/2020 | Puri et al. |
| 10,635,894 B1 | 4/2020 | Genner |
| 10,650,226 B2 | 5/2020 | Chu et al. |
| 10,733,424 B2 | 8/2020 | Son et al. |
| 10,735,205 B1 | 8/2020 | Wentz et al. |
| 10,796,178 B2 | 10/2020 | Fan et al. |
| 10,810,423 B2 | 10/2020 | Thavalengal |
| 11,080,516 B1 | 8/2021 | Joshi et al. |
| 11,080,517 B2 | 8/2021 | Wu et al. |
| 11,093,771 B1 | 8/2021 | Genner |
| 11,095,631 B1 | 8/2021 | Genner |
| 11,151,468 B1 | 10/2021 | Chen et al. |
| 11,328,532 B2 * | 5/2022 | Harris ............... G06V 40/172 |
| 11,527,104 B2 * | 12/2022 | Rittman ............... G06T 7/50 |
| 2004/0019570 A1 | 1/2004 | Bolle et al. |
| 2004/0096085 A1 | 5/2004 | Matsumoto et al. |
| 2004/0186906 A1 | 9/2004 | Torrant et al. |
| 2005/0235148 A1 | 10/2005 | Scheidt et al. |
| 2006/0015358 A1 | 1/2006 | Chua |
| 2006/0042483 A1 | 3/2006 | Work et al. |
| 2006/0114520 A1 | 6/2006 | Enomoto et al. |
| 2006/0212931 A1 | 9/2006 | Shull et al. |
| 2007/0174633 A1 | 7/2007 | Draper et al. |
| 2008/0310727 A1 | 12/2008 | Wu et al. |
| 2008/0313714 A1 | 12/2008 | Fetterman et al. |
| 2009/0022374 A1 | 1/2009 | Boult |
| 2009/0080717 A1 | 3/2009 | Dias |
| 2009/0110248 A1 * | 4/2009 | Masuda ............... G07C 9/37<br>382/118 |
| 2009/0210722 A1 | 8/2009 | Russo |
| 2009/0271634 A1 | 10/2009 | Boult et al. |
| 2009/0310830 A1 | 12/2009 | Bolle et al. |
| 2009/0327054 A1 | 12/2009 | Yao et al. |
| 2010/0017618 A1 | 1/2010 | Golic et al. |
| 2010/0194919 A1 | 8/2010 | Ishii et al. |
| 2010/0250676 A1 | 9/2010 | Ufford et al. |
| 2011/0099277 A1 | 4/2011 | Yao et al. |
| 2011/0131643 A1 | 6/2011 | Lawrence et al. |
| 2011/0137789 A1 | 6/2011 | Kortina et al. |
| 2011/0246766 A1 | 10/2011 | Orsini et al. |
| 2011/0285748 A1 | 11/2011 | Slatter et al. |
| 2012/0011066 A1 | 1/2012 | Telle et al. |
| 2012/0014507 A1 | 1/2012 | Wu et al. |
| 2012/0072384 A1 | 3/2012 | Schreiner et al. |
| 2012/0102332 A1 | 4/2012 | Mullin |
| 2012/0124651 A1 | 5/2012 | Ganesan et al. |
| 2012/0130863 A1 | 5/2012 | Tedjamulia et al. |
| 2012/0284786 A1 | 11/2012 | Somani et al. |
| 2012/0331567 A1 | 12/2012 | Shelton |
| 2013/0004033 A1 | 1/2013 | Trugenberger |
| 2013/0086641 A1 | 4/2013 | Mehr et al. |
| 2013/0104202 A1 | 4/2013 | Yin et al. |
| 2013/0124644 A1 | 5/2013 | Hunt et al. |
| 2013/0191898 A1 | 7/2013 | Kraft |
| 2013/0219479 A1 | 8/2013 | DeSoto et al. |
| 2013/0259228 A1 | 10/2013 | Ren et al. |
| 2013/0262873 A1 | 10/2013 | Read et al. |
| 2014/0013422 A1 | 1/2014 | Janus et al. |
| 2014/0020073 A1 | 1/2014 | Ronda et al. |
| 2014/0037074 A1 | 2/2014 | Bravo et al. |
| 2014/0037156 A1 | 2/2014 | Cavallini |
| 2014/0059660 A1 | 2/2014 | Marra et al. |
| 2014/0071131 A1 | 3/2014 | Kitago |
| 2014/0075513 A1 | 3/2014 | Trammel et al. |
| 2014/0090039 A1 | 3/2014 | Bhow |
| 2014/0101434 A1 | 4/2014 | Senthurpandi et al. |
| 2014/0129493 A1 | 5/2014 | Leopold |
| 2014/0164218 A1 | 6/2014 | Stewart |
| 2014/0230023 A1 | 8/2014 | Parks |
| 2014/0247985 A1 | 9/2014 | Park |
| 2014/0253707 A1 | 9/2014 | Gangadhar |
| 2014/0258305 A1 | 9/2014 | Kapadia et al. |
| 2014/0270404 A1 | 9/2014 | Hanna et al. |
| 2014/0273978 A1 | 9/2014 | Van Snellenberg |
| 2014/0279556 A1 | 9/2014 | Priebatsch et al. |
| 2014/0289833 A1 | 9/2014 | Briceno et al. |
| 2014/0330732 A1 | 11/2014 | Grignon |
| 2014/0333415 A1 | 11/2014 | Kursun |
| 2014/0337948 A1 | 11/2014 | Hoyos |
| 2015/0046327 A1 | 2/2015 | Taupitz |
| 2015/0059003 A1 | 2/2015 | Bouse |
| 2015/0078630 A1 | 3/2015 | Derakhshani et al. |
| 2015/0121456 A1 | 4/2015 | Milman et al. |
| 2015/0154436 A1 | 6/2015 | Shi et al. |
| 2015/0156031 A1 | 6/2015 | Fadell et al. |
| 2015/0180857 A1 | 6/2015 | Schulman et al. |
| 2015/0186721 A1 | 7/2015 | Derakhshani et al. |
| 2015/0205800 A1 | 7/2015 | Work et al. |
| 2015/0227890 A1 | 8/2015 | Bednarek et al. |
| 2015/0261999 A1 | 9/2015 | Thiebot et al. |
| 2015/0269394 A1 | 9/2015 | Bringer et al. |
| 2015/0332169 A1 | 11/2015 | Bivens et al. |
| 2016/0019614 A1 | 1/2016 | Dziuk |
| 2016/0034708 A1 | 2/2016 | Shim et al. |
| 2016/0037156 A1 | 2/2016 | Lee |
| 2016/0048837 A1 | 2/2016 | Jin et al. |
| 2016/0050199 A1 | 2/2016 | Ganesan |
| 2016/0070704 A1 | 3/2016 | Yu |
| 2016/0070851 A1 * | 3/2016 | Wang ............... G16B 5/00<br>703/2 |
| 2016/0085958 A1 | 3/2016 | Kang |
| 2016/0088023 A1 | 3/2016 | Handa et al. |
| 2016/0132901 A1 | 5/2016 | Davar et al. |
| 2016/0162604 A1 * | 6/2016 | Xiaoli ............... G06F 30/10<br>703/1 |
| 2016/0173605 A1 | 6/2016 | Iasi et al. |
| 2016/0191513 A1 | 6/2016 | Tomlinson et al. |
| 2016/0224853 A1 | 8/2016 | Xiong |
| 2016/0269178 A1 | 9/2016 | Yang et al. |
| 2016/0277424 A1 | 9/2016 | Mawji et al. |
| 2016/0379182 A1 | 12/2016 | Sheng et al. |
| 2017/0006008 A1 | 1/2017 | Moran et al. |
| 2017/0019400 A1 | 1/2017 | Drolshagen et al. |
| 2017/0032485 A1 | 2/2017 | Vemury |
| 2017/0034183 A1 | 2/2017 | Enqvist et al. |
| 2017/0061138 A1 | 3/2017 | Lambert |
| 2017/0082740 A1 | 3/2017 | Kitchens, II et al. |
| 2017/0134366 A1 | 5/2017 | Genner et al. |
| 2017/0140204 A1 | 5/2017 | Derakhshani et al. |
| 2017/0173371 A1 * | 6/2017 | Truex ............... A62B 18/02 |
| 2017/0210525 A1 | 7/2017 | Mayer et al. |
| 2017/0250796 A1 | 8/2017 | Samid |
| 2017/0256056 A1 | 9/2017 | Jain et al. |
| 2017/0264599 A1 | 9/2017 | O'Regan et al. |
| 2017/0279795 A1 | 9/2017 | Redberg |
| 2017/0286788 A1 | 10/2017 | Fan et al. |
| 2017/0331818 A1 | 11/2017 | Kader et al. |

(56) References Cited

U.S. PATENT DOCUMENTS

| | | |
|---|---|---|
| 2017/0346851 A1 | 11/2017 | Drake |
| 2017/0372055 A1 | 12/2017 | Robinson et al. |
| 2018/0005019 A1 | 1/2018 | Chattopadhyay et al. |
| 2018/0018651 A1 | 1/2018 | Nelson et al. |
| 2018/0034852 A1 | 2/2018 | Goldenberg |
| 2018/0048472 A1 | 2/2018 | Pirrwitz et al. |
| 2018/0060648 A1 | 3/2018 | Yoo et al. |
| 2018/0069703 A1 | 3/2018 | Chakraborty et al. |
| 2018/0077571 A1 | 3/2018 | Mannopantar et al. |
| 2018/0082455 A1 | 3/2018 | Yamaji et al. |
| 2018/0097806 A1 | 4/2018 | Blinn |
| 2018/0101742 A1 | 4/2018 | Burge et al. |
| 2018/0167388 A1 | 6/2018 | Farrell et al. |
| 2018/0191501 A1 | 7/2018 | Lindemann |
| 2018/0205557 A1 | 7/2018 | Sun |
| 2018/0211092 A9 | 7/2018 | Derakhshani et al. |
| 2018/0248699 A1 | 8/2018 | Andrade |
| 2018/0285630 A1* | 10/2018 | Han .................. G06V 40/171 |
| 2018/0302406 A1 | 10/2018 | Burckhardt et al. |
| 2018/0307895 A1 | 10/2018 | Chu et al. |
| 2018/0373924 A1* | 12/2018 | Yoo .................... G06V 10/454 |
| 2019/0043148 A1 | 2/2019 | Vemury |
| 2019/0311102 A1 | 10/2019 | Tussy |
| 2019/0312734 A1 | 10/2019 | Wentz et al. |
| 2019/0334884 A1 | 10/2019 | Ross et al. |
| 2019/0379541 A1 | 12/2019 | Schwach et al. |
| 2020/0036707 A1 | 1/2020 | Callahan et al. |
| 2020/0050836 A1* | 2/2020 | Gugino .................. G06T 17/00 |
| 2020/0082157 A1* | 3/2020 | Susskind ............... G06V 40/18 |
| 2020/0084191 A1 | 3/2020 | Nicholls |
| 2020/0145219 A1 | 5/2020 | Sebastian et al. |
| 2020/0153624 A1 | 5/2020 | Wentz et al. |
| 2020/0186350 A1 | 6/2020 | Wentz et al. |
| 2020/0201679 A1 | 6/2020 | Wentz |
| 2020/0257889 A1 | 8/2020 | Merkel et al. |
| 2020/0293640 A1 | 9/2020 | Joshi et al. |
| 2020/0351089 A1 | 11/2020 | Wentz |
| 2020/0351098 A1 | 11/2020 | Wentz |
| 2020/0351657 A1 | 11/2020 | Wentz |
| 2020/0356085 A1 | 11/2020 | Wentz et al. |
| 2020/0404019 A1 | 12/2020 | Drake |
| 2021/0019519 A1 | 1/2021 | Martin et al. |
| 2021/0027080 A1 | 1/2021 | Storm et al. |
| 2021/0056289 A1* | 2/2021 | Kochi .................. G06V 40/168 |
| 2021/0073518 A1 | 3/2021 | Kumar et al. |
| 2021/0304567 A1* | 9/2021 | Tinsman ............. G07F 17/3274 |
| 2021/0322701 A1* | 10/2021 | Gugino .................. A61M 16/06 |
| 2021/0374468 A1* | 12/2021 | Chandraker ........... G06N 3/084 |
| 2022/0100989 A1* | 3/2022 | Zhu ...................... G06F 21/602 |
| 2022/0300591 A1* | 9/2022 | Kim ..................... G06V 40/168 |
| 2023/0343040 A1* | 10/2023 | Donoghue ............. G06V 20/20 |

FOREIGN PATENT DOCUMENTS

| | | |
|---|---|---|
| WO | 2008010773 A1 | 1/2008 |
| WO | 2019034589 A1 | 2/2019 |

OTHER PUBLICATIONS

Wonjun Kim, Face Liveness Detection From a Single Image via Diffusion Speed Model, IEEE Transactions on Image Processing, vol. 24, No. 8, Apr. 13, 2015, pp. 2456 to 2465.

Xinting Gao, Single-View Recaptured Image Detection Based on Physics-Based Features, 2010 IEEE International Conference on Multimedia and Expo, Jul. 19, 2010, pp. 1469 to 1474.

Di Wen, Face Spoof Detection with Image Distortion Analysis, IEEE Transactions on Information Forensics and Security, vol. 10, No. 4, Apr. 2015, pp. 746 to 761.

Rohit Kumar Pandey, Deep Secure Encoding for Face Template Protection, Conference on Computer Vision and Pattern Recognition Workshops, Jun. 26, 2016, pp. 77 to 83.

* cited by examiner

FACE COVER-COMPATIBLE BIOMETRICS AND PROCESSES FOR GENERATING AND USING SAME

CROSS REFERENCE TO RELATED APPLICATIONS

This application claims the benefits of and priority to U.S. Patent Application No. 63/027,072, filed May 19, 2020, titled "FACE COVER-COMPATIBLE BIOMETRICS AND PROCESSES FOR GENERATING AND USING SAME," the disclosure of which is incorporated herein by reference in its entirety.

TECHNICAL FIELD

The present systems and processes relate generally to biometric representation, verification, and identification.

BACKGROUND

Facial biometrics are commonly used for identity authentication during biometric enrollment as the facial image can be compared to the facial image on an identity documents such as a passport or other state issued document. However, for individuals in some communities it is common for a face covering to be worn and, for various cultural and/or religious reasons, to not be removed in the presence of non-relatives. For example, in some Islamic communities it is common for women to wear a Niqāb, being a veil, which covers the totality of the hair, neck, shoulders, and face except for the eyes. In some cases, the Niqāb also has a mesh that covers the eyes. When worn, the Niqāb is not generally removed in places where the woman may encounter non-related men, such as, for example, airports and other transit hubs.

Individuals wearing such face coverings are effectively precluded from using increasingly common facial biometric authentication tools in any public place. Although eye-based biometrics may be used, for example, if the covering, does not include obstructive mesh over the eyes, there is no effective mechanism to use eye-based biometrics for initial biometric enrollment as there is no means to establish a connection between the legal identity of the individual and their eyes.

Therefore, there exists a long-felt, but unmet need for a system or process that allows for enrollment of biometric information from individuals wearing face coverings such that subsequent biometric identification and verification processes may not require the individuals to remove their face coverings.

BRIEF SUMMARY OF THE DISCLOSURE

Briefly described, and according to one embodiment, aspects of the present disclosure generally relate to biometric enrollment of individuals leveraging calibrated and/or multimodal biometric analysis. In various embodiments, the present systems and methods allow for enrollment of an individual into a biometric matching system in a manner such that subsequent biometric identification and verification processes for the individual do not require the individual to reveal their face, or at least a significant portion thereof.

According to a first aspect, a method, comprising: A) receiving an uncovered face image of a subject; B) generating a first fixed-size representation (FXR) based on the uncovered face image; C) obtaining a covered face image of the subject; D) generating a second FXR based on the covered face image; and E) creating a record of the first FXR and the second FXR in association with the subject.

According to a further aspect, the method of the first aspect or any other aspect, further comprising: A) receiving a second face image of a second subject; B) determining a mask probability based on the second face image; C) generating a third FXR based on the second face image; D) retrieving the first FXR and the second FXR; E) generating: 1) a first similarity score by comparing the third FXR to the first FXR; and 2) a second similarity score by comparing the third FXR to the second FXR; F) calibrating the first similarity score and the second similarity score based on the mask probability to generate a third similarity score; G) determining that the third similarity score satisfies a predetermined threshold; and H) verifying that the second subject and the subject are the same based on the determination.

According to a further aspect, the method of the first aspect or any other aspect, further comprising providing the second subject access to a digital environment or restricted area based on the verification.

According to a further aspect, the method of the first aspect or any other aspect, further comprising: A) receiving a second face image of a second subject; B) determining a mask probability based on the second face image; C) generating a third FXR based on the second face image; D) generating a plurality of similarity scores based on comparisons between the third FXR and a plurality of paired FXRs, wherein a particular pair of the plurality of paired FXRs comprises the first FXR and the second FXR; E) calibrating each of the plurality of similarity scores based on the mask probability to generate a plurality of calibrated similarity scores; F) determining a top-ranked calibrated similarity score from the plurality of calibrated similarity scores, wherein the top-ranked calibrated similarity score was derived from the comparison between the third FXR and the particular pair of the plurality of paired FXRs; and G) determining that the second subject and the subject are the same based on a determination that the top-ranked calibrated similarity score meets a predetermined threshold.

According to a further aspect, the method of the first aspect or any other aspect, further comprising transmitting an alert to a computing device based on the determination that the second subject and the subject are the same.

According to a further aspect, the method of the first aspect or any other aspect, wherein each of the pairs of the plurality of paired FXRs comprises a covered face FXR and an uncovered face FXR.

According to a further aspect, the method of the first aspect or any other aspect, wherein obtaining the covered face image of the subject comprises generating the covered face image based on the uncovered face image.

According to a further aspect, the method of the first aspect or any other aspect, wherein generating the covered face image comprises adding an artificial representation of a face covering to the uncovered face image.

According to a further aspect, the method of the first aspect or any other aspect, wherein the face covering is a face mask.

According to a further aspect, the method of the first aspect or any other aspect, wherein adding the representation of the artificial face covering to the uncovered face image comprises: A) generating a head pose estimation of the subject based on the uncovered face image; and B) fitting a 3-D virtual face covering to the uncovered face image of the subject based on the head pose estimation.

According to a further aspect, the method of the first aspect or any other aspect, wherein adding the representation of the artificial face covering to the uncovered face image comprises: A) detecting, via a face detection algorithm, a face, a nose, and a mouth of the subject within the uncovered face image; B) generating a cropped face image by cropping the face from the uncovered face image according to a normalized coordinate set; C) aligning, via an image warping technique, the cropped face image according to the normalized coordinate set; and D) fitting the 3-D virtual face covering to the cropped face image such that the 3-D virtual face covering covers the nose and the mouth of the subject.

According to a further aspect, the method of the first aspect or any other aspect, further comprising detecting, via the face detection algorithm, a pair of eyes within the uncovered face image, wherein: A) adding the representation of the artificial face covering to the uncovered face image further comprises generating a second cropped face image by aligning, via the image warping technique, the pair of eyes in the cropped face image according to a second normalized coordinate set; and B) the step of fitting the 3-D virtual face covering is performed on the second cropped face image.

According to a further aspect, the method of the first aspect or any other aspect, wherein the second normalized coordinate set comprises a left eye center coordinate and a right eye center coordinate.

According to a further aspect, the method of the first aspect or any other aspect, wherein the second normalized coordinate set comprises a nose coordinate.

According to a further aspect, the method of the first aspect or any other aspect, wherein the second normalized coordinate set comprises a first corner mouth coordinate and a second corner mouth coordinate.

According to a second aspect, a method for biometric verification, comprising: A) receiving an image of a subject, wherein the image comprises a face; B) determining a mask probability based on the image; C) generating a first FXR based on the image; D) retrieving a second FXR and a third FXR; E) generating: 1) a first similarity score by comparing the first FXR and the second FXR; and 2) a second similarity score by comparing the first FXR and the third FXR; F) calibrating the first similarity score and the second similarity score based on the mask probability to generate a third similarity score; G) determining that the third similarity score satisfies a predetermined threshold; and H) verifying that the second subject and the subject are the same based on the determination.

According to a further aspect, the method of the second aspect or any other aspect, further comprising: A) detecting the face in the image; and B) generating a cropped facial image of the face, wherein: 1) determining the mask probability comprises applying a trained machine learning model to the cropped facial image to generate a posterior probability that the cropped facial image includes a face covering over the face; and 2) the mask probability comprises the posterior probability.

According to a further aspect, the method of the second aspect or any other aspect, wherein the trained machine learning model is a convolutional neural network.

According to a further aspect, the method of the second aspect or any other aspect, wherein: A) the convolutional neural network was trained using a training dataset comprising a plurality of cropped facial images; and B) the plurality of cropped facial images comprises: 1) a first subset comprising cropped covered facial images; and 2) a second subset comprising cropped uncovered facial images, wherein the second subset excludes the first subset.

According to a further aspect, the method of the second aspect or any other aspect, wherein: A) calibrating the first similarity score and the second similarity score comprises computing a log-likelihood ratio; and B) the third similarity score comprises the log-likelihood ratio.

According to a further aspect, the method of the second aspect or any other aspect, wherein: A) calibrating the first similarity score and the second similarity score comprises computing a direct posterior probability estimation; and B) the third similarity score comprises the direct posterior probability estimation.

According to a third aspect, a system for biometric verification, comprising a server having a processor configured to: A) receive an image of a subject, wherein the image comprises a face; B) determine a mask probability based on the image; C) generate a first FXR based on the image; D) retrieve a second FXR and a third FXR; E) generate: 1) a first similarity score by comparing the first FXR and the second FXR; and 2) a second similarity score by comparing the first FXR and the third FXR; F) calibrate the first similarity score and the second similarity score based on the mask probability to generate a third similarity score; G) determine that the third similarity score satisfies a predetermined threshold; and H) verify that the second subject and the subject are the same based on the determination.

According to a further aspect, the system of the third aspect or any other aspect, wherein the processor is further configured to: A) detect the face in the image; and B) generate a cropped facial image of the face, wherein: 1) determining the mask probability comprises applying a trained machine learning model to the cropped facial image to generate a posterior probability that the cropped facial image includes a face covering over the face; and 2) the mask probability comprises the posterior probability.

According to a further aspect, the system of the third aspect or any other aspect, wherein the trained machine learning model is a convolutional neural network.

According to a further aspect, the system of the third aspect or any other aspect, wherein: A) the convolutional neural network was trained using a training dataset comprising a plurality of cropped facial images; and B) the plurality of cropped facial images comprises: 1) a first subset comprising cropped covered facial images; and 2) a second subset comprising cropped uncovered facial images, wherein the second subset excludes the first subset.

In one or more embodiments, a facial image is captured in a private setting and temporarily stored on a computing device. In at least one embodiment, identity data is extracted from a capture (e.g., a scan, image, etc.) of an identity document, such as a passport, and the identity data includes a facial image. According to one embodiment, the identity data and captured facial image are compared to verify they represent the same individual. In various embodiments, upon verifying the identity data and facial image, an image of a second biometric feature is captured in two images. In one example, the second biometric features include, but are not limited to, eyes (or features thereof, such as irises), fingerprint, palm print, hand geometry, voice, gait, behavior biometrics, and other biometric features or combinations thereof. According to one embodiment, the first image is a multimodal biometric image including the individual's face and the second biometric feature. In one or more embodiments, the second image is an image of only the second biometric feature. In some embodiments, capturing the second image includes aligning the second biometric feature within a template rendered on a display of a computing device used for image capturing. In at least one embodiment, the second image is referred to as a "feature" image.

In one or more embodiments, the first image and second image are compared to determine if the second biometric feature of each image are identical (e.g., by demonstrating a similarity metric satisfying a predetermined threshold). According to one embodiment, upon determining that the second biometric features shown in the first and second images are sufficiently similar, the second image is saved as a biometric representation of the individual, and the first image and facial image are deleted from the computing device. In one or more embodiments, the second image is saved on the computing device and/or uploaded to a remote database (e.g., such as a cloud-based database). In various embodiments, the identity data is stored in the remote database along with or separate from the second "feature" image. In one or more embodiments, the identity data and second image are used in future verification and identification processes and allow for such processes to occur without requiring the individual to reveal their face (or at least a significant portion thereof.

In at least one embodiment, various images described herein can be evaluated to determine that the image represents a live subject (e.g., as opposed to the image being a static copy of another subject image). In one example, probability of liveness is determined according to one or more systems and processes described in:

- U.S. patent application Ser. No. 16/855,606, filed Apr. 22, 2020, titled "SYSTEMS AND METHODS FOR PASSIVE-SUBJECT LIVENESS VERIFICATION IN DIGITAL MEDIA";
- U.S. patent application Ser. No. 15/782,940, now U.S. Pat. No. 10,635,894, filed Oct. 13, 2017, titled "SYSTEMS AND METHODS FOR PASSIVE-SUBJECT LIVENESS VERIFICATION IN DIGITAL MEDIA";
- U.S. Patent Application No. 62/407,817, filed Oct. 13, 2016, titled "PASSIVE-SUBJECT LIVENESS TESTING OF PHOTOGRAPHIC IMAGES";
- U.S. Patent Application No. 62/407,852, filed Oct. 13, 2016, titled "TRUSTED COMMUNICATION STAMP"; and
- U.S. Patent Application No. 62/407,693, filed on Oct. 13, 2016, titled "MEDICAL TRUST STAMP," the disclosures of which are incorporated herein by reference as if set forth in their entireties.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
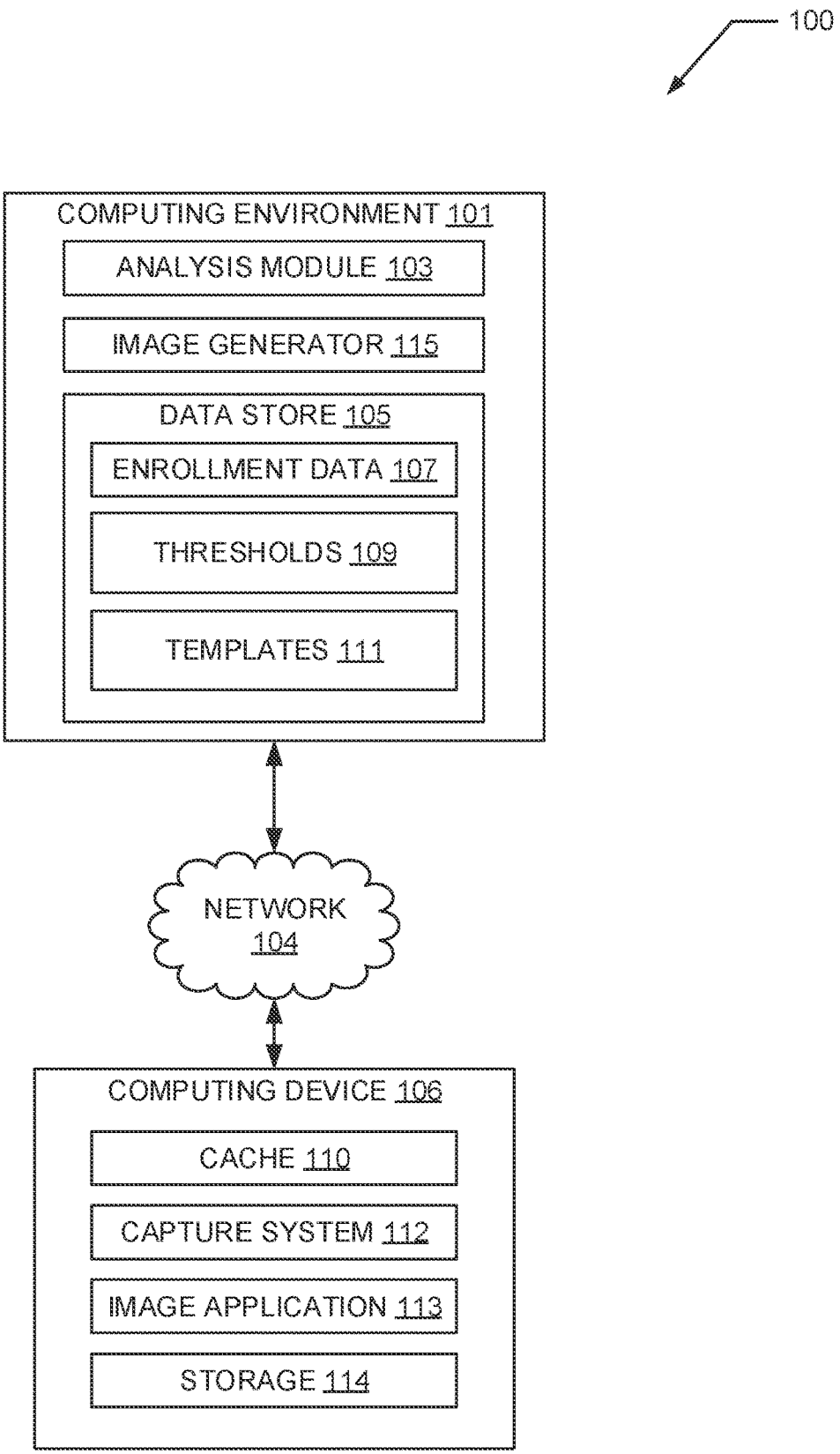
FIG. 1 is a diagram of an exemplary networked environment according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As used herein, "biometric representation" generally refers to an electronic representation (e.g., data object(s)) of biometric signatures sourced from biometric sources including, but not limited to, facial scans, palm scans, fingerprints, retinal scans, sounds, and signals, among others. Thus, the present biometric sources are not limited to physical or behavioral sources, but may include any source that produces data suitable for representation via a set of unrelated data objects. In some embodiments, the biometric representation is a hash that is generated by hashing biometric data according to one or more transformation parameters, techniques, and/or algorithms. As used herein, biometric representation can be synonymous and used interchangeably with "biometric template."

As used herein, "privacy-secured token" generally refers to a transformed biometric template (e.g., or embedded vector) that is generated by applying one or more transformation to an original template to create a transformed biometric template that obfuscates the original data of the original template. In at least one embodiment, a privacy-secured token may be a biohash or an irreversibly transformed identity token (($IT)^2$ token), that can be used in place of a source biometric template in biometrics matching processes for verifying or uniquely identifying individuals. In the present disclosure, the terms privacy-secured token, privacy-secured template, biohash, and $(IT)^2$ token may be used interchangeably.

As used herein, "irreversible transform" generally refers to one or more algorithms or other techniques that are applied to a first data object to generate a second data object that contains less information than the first data object such that the second data object cannot be reverse-transformed to recover the first data object. An irreversible transform may be performed according to one or more embodiments as described in:

U.S. patent application Ser. No. 16/841,269, filed Apr. 6, 2020, entitled "SYSTEMS AND PROCESSES FOR LOSSY BIOMETRIC REPRESENTATIONS;"

U.S. Patent Application No. 62/829,625, filed Apr. 5, 2019, entitled "EVERGREEN HASH";

U.S. patent application Ser. No. 16/406,978, filed May 8, 2019, entitled "SYSTEMS AND METHODS FOR ENHANCED HASH TRANSFORMATIONS"; U.S. Application No. 62/829,825, filed Apr. 5, 2019, entitled "EVERGREEN HASH"; and U.S. Application No. 62/668,576, filed May 5, 2018, entitled "THE EVERGREEN HASH," the disclosures of which are incorporated herein by reference as if fully set forth herein in their entireties.

As used herein, a "capture" generally refers to data derived from an original source (for example, a living subject) and that was received at or generated by a computing environment of the present biometric systems (e.g., or generated by a computing device in communication therewith). In at least one embodiment, a capture refers to any data from which biometric representations and/or non-biodata representations are derived or extracted. In one example, a capture includes an image of a subject including the subject's face. In another example, a capture includes an image of a subject's hand (e.g., including a palm and one or more fingers). In another example, a capture includes an image or other data representation of a subject's iris. A capture can refer to data derived from a synthetically generated original source or can refer to the original source itself. For example, a capture can refer to an artificial hand that was synthetically generated based on a pseudorandom seed value. In another example, a capture can refer to synthetic fingerprint minutiae derived from a synthetically generated finger. As used herein, data defining a synthetic source is generally referred to as "synthetic data."

As used herein, "uncovered face image of a subject" generally refers to an image that shows a face of a subject wherein the face is covered by some obstruction, such as a mask.

As used herein, a "similarity score" generally refers to a distance score, such as, for example, a Euclidean distance or $L^2$ norm metric, or a probability score (e.g., a measure of the likelihood that two representations are derived from the same source). The similarity score can refer to a measure of distance or difference between vector-based representations. For example, the similarity score can refer to a value of cosine similarity or Pearson coefficient. In various embodiments, the above referenced distance formulae result in substantially identical matching performance due to the use of normalized cohort vectors. According to one embodiment, in cases where privacy-secured tokens are used, the matching performance may be substantially similar. In either case, it will be understood and appreciated that one or more embodiments of the present system may use one or more algorithms or optimization techniques to support computational efficiency and improve matching speed.

In at least one embodiment, the process of transforming an original biometric scan into a derived biometric template is referred to as "embedding" or "feature extraction and representation." In the present system, embedding may be achieved by performing one or more comparisons. According to various embodiments, the present system may utilize one-to-many comparison techniques, which involve comparing a probe sample to a set of cohort templates to produce a set of similarity scores. The one-to-many technique may quantify comparisons by calculating, between the probe sample and each (stored or other reference) template, a Euclidean distance or an $L^2$ norm metric. While the exact computation for each metric varies, each metric may result in identical biometric matching performance because normalized cohort vectors can be generated from metrics produced in either approach. In one example, the set of similarity scores are used as a representation of the probe template and are further transformed into a privacy-secured token (e.g., by a lossy transformation technique) to further increase security and privacy. In another example, the set of similarity scores are used to identify the subject associated with the probe template (e.g., a highest-scoring cohort template being identified as representing the subject). In various embodiments, the present system may implement one or more algorithmic techniques, such as cohort selection algorithms, to increase computational efficiency of one-to-many comparison processes, which may be desirable, for example, in instances where large databases (e.g., in excess of one million subjects) are processed.

In the present disclosure, the descriptor "probe" can be used to refer to a representation (e.g., or source associated therewith) that may or may not be derived from the same source as another representation. For example, a probe fixed size representation (FXR) generally refers to a FXR that may or may not be derived from the same source as a second FXR (e.g., referred to as an enrollment FXR or a template FXR). In another example, a probe subject generally refers to a subject that may or may not be the same as a previous subject for which an enrollment FXR was previously generated.

Overview Aspects of the present disclosure generally relate to face cover-compatible biometric systems and processes.

According to one embodiment, face cover compatible biometric processes experience a significant challenge due to significant parts of the face around the mouth and nose being occluded. Systems that attempt to exploit the features around the eyes may not be able to exploit the mouth and nose features even when they are available. Further, systems that exploit the entire face may experience significant losses in performance when the probe image includes a face covering. In various embodiments, the present systems and processes provide an efficacious face cover compatible biometric solution that performs sufficiently accurate matching processes on biometric images with or without face coverings. In at least one embodiment, when the present systems and processes are presented with a facial probe in which the nose and mouth are visible, the additional facial information is exploited, and when the facial probe excludes the nose and mouth (e.g., the features are not visible), facial information related to the obfuscated nose and mouth is ignored. In other words, the present biometric systems are tolerant of biometric probe images that exclude anatomy that is typically required by previous face-based biometric approaches. According to one embodiment, the present systems and processes mitigate the significant degradation in performance demonstrated by previous approaches when presented with enrollment image and probe images that include face coverings. In various embodiments, the present systems and processes support sufficiently accurate and rapid biometric process in instances where a) an enrollment image and a probe image each include a face covering, b) an enrollment image includes a face covering and a probe image excludes a face covering, c) an enrollment excludes a face covering and a probe image includes a face covering, and d) an enrollment image and a probe image each exclude a face covering.

Exemplary Systems Referring now to the figures, for the purposes of example and explanation of the fundamental processes and components of the disclosed systems and processes, reference is made to FIG. 1, which illustrates an exemplary biometric system 100 in which the various systems described herein are implemented and/or in which the various described processes are performed. As will be understood and appreciated, the exemplary biometric system 100 shown in FIG. 1 represents merely one approach or embodiment of the present system, and other aspects are used according to various embodiments of the present system.

In one or more embodiments, the biometric system 100 includes a computing environment 101 configured to perform various biometric functions including, but not limited to, biometric enrollment, biometric verification, biometric identification, and biometric querying. In at least one embodiment, the computing environment 101 is in communication with a computing device 106 via a network 104. The computing environment 101 can include a server computer, or any other system providing computing capability. Alternatively, the computing environment may employ a plurality of computing devices that may be arranged, for example, in one or more server banks or computer banks or other arrangements. Such computing devices can be located in a single installation or may be distributed among many different geographical locations. For example, the computing environment can include a plurality of computing devices that together may include a hosted computing resource, a grid computing resource, and/or any other distributed computing arrangement. In some cases, the computing environment can correspond to an elastic computing resource where the allotted capacity of processing, network, storage, or other computing-related resources may vary over time. According to one embodiment, the computing device 106 generally refers to electronic systems and devices that capture, process, store, and/or perform actions based at least in part on biometric data. The computing device 106 can refer to a device controlled by a subject to-be-represented and/or -evaluated by the present systems and processes. In at least one embodiment, the computing device 106 includes any capture device or system in communication with a capture device (e.g., such as a surveillance system connected to one or more security cameras). Non-limiting examples of the computing device 106 include mobile devices (e.g., such as smartphones, tablets, smart accessories, etc.), network-enabled camera systems, and Internet of Things (IoT) devices.

In one or more embodiments, the computing device 106 includes a cache 110, capture system 112, an image application 113, and storage 114. In various embodiments, the cache 110 temporarily stores images, such as facial images and multimodal images captured by the capture system 112 (e.g., which may include one or more cameras or other sensors for capturing images). In one or more embodiments, the image application 113 communicates with the computing environment 101 to perform various functions including, but not limited to, transmitting captured images and data (e.g., identity data), extracting images from identity data, causing templates 111 to be rendered on a display of the device, and, in some embodiments, performing comparisons of various images as discussed herein. In one or more embodiments, the storage 114 stores authenticated feature images and/or identity data for use in future identity authentication processes such that an individual (e.g., that has been enrolled in a biometric system as described herein) is not required to remove a face covering. In some embodiments, a biometric enrollment, verification, and/or identification process includes installing and/or registering the image application 113 to the computing device 106. In some embodiments, the computing environment 101 coordinates various functions and processes with the image application 113 running on the computing device 106.

The network 104 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks. The biometric system 100 can communicate with a first computing device 106 over a first network 104 and communicate with a second computing device 102 over a second network. In at least one embodiment, the computing environment 101 accesses one or more application programming interfaces (API) to facilitate communication and interaction between the computing environment 101 and one or more external systems 102.

The computing environment 101 can execute various applications and functionalities described herein. In at least one embodiment, the computing environment 101 includes an analysis module 103 for comparing biometric data, for example, in the form of images captured by a capture system 112 of the computing device 106 (e.g., or images derived therefrom). In some embodiments, various functions and processes performed at the analysis module 103 are performed in the image application 113. In alternate embodiments, the analysis module 103 is included in the image application 113, for example, as one or more software programs or applications executed thereby.

In one or more embodiments, the analysis module 103 performs biometric data comparisons by generating and calibrating similarity scores to quantify comparisons between two or more biometric representations (e.g., fixed-size representations, or privacy-secured tokens derived therefrom). Non-limiting examples of similarity scores include probability metrics, such as, for example, posterior probability, and distance metrics, such as, for example, $L^2$ norm, squared Euclidean distance, and cosine similarity. In one example, the analysis module 103 compares a first fixed-size representation (FXR) of a first facial image to a second FXR of a second facial image. In this example, the analysis module outputs a $L^2$ norm value to quantify the similarity between the first and second FXRs.

In one or more embodiments, the analysis module 103 calibrates similarity scores according to one or more techniques. In various embodiments, the analysis module 103 generates a calibrated similarity score from two or more input similarity scores. According to one embodiment, the analysis module 103 uses a mask probability score (e.g., a posterior probability that a face image includes a face covering) as an input to similarity score calibration. In at least one embodiment, the analysis module 103 generates a calibrated similarity score by computing a log likelihood ratio according to Equation 1, the variables of which are described in Table 1.

$$LLR(d_{m0}, d_{m1}, q_{m1}) = \log\left(\frac{\sum_{m\in\{m0,m1\}} p(d_m|m, k=1)Prob(m|\text{Image}_{probe})}{\sum_{m\in\{m0,m1\}} p(d_m|m, k=0)Prob(m|\text{Image}_{probe})}\right)$$
$$= \log\left(\frac{p(d_{m0}|m0, k=1)q_{m0} + p(d_{m1}|m1, k=1)q_{m1}}{p(d_{m0}|m0, k=0)q_{m0} + p(d_{m1}|m1, k=0)q_{m1}}\right)$$

(Equation 1)

| Variable | Definition |
| --- | --- |
| m | Face covering state |
| m0 | Data excludes a face covering (for example, $FXR_{m0}$ refers to an FXR derived from a facial image excluding a face covering) |
| m1 | Data includes a face covering (for example, $FXR_{m1}$ refers to an FXR derived from a facial image including a face covering) |
| $d_{m0}$ | Distance score or similarity score between face cover-excluded FXRs. For example: $d_{m0}$ = distance($FXR_{m0}$, $FXR_{probe}$) |
| $d_{m1}$ | Distance score or similarity score between face cover-included FXRs. For example: $d_{m0}$ = distance($FXR_{m1}$, $FXR_{probe}$) |
| $q_{m1}$ | Probability of an image including a face covering. For example: $q_{m1}$ = Prob(m1 | $\text{Image}_{probe}$) |
| $P(d_m \mid m, k=1)$ | Probability density function of the observed distance score d given the face covering state m and a comparison state k |
| k | Comparison state in which k = 0 refers to a non-mated comparison and k = 1 refers to a mated comparison |

Table 1. Exemplary Likelihood Ratio Variables

In at least one embodiment, the analysis module 103 generates a calibrated similarity score by computing a direct posterior probability estimation according to Equation 2, the variables of which are described in Table 1.

$$Prob(k=1|d_{m0}, d_{m1}, m) = \sum_{m\in\{m0,m1\}} Prob(k=1|d_m, m)Prob(m|\text{Image}_{probe})$$
$$= Prob(k=1 \mid d_{m0}, m0)q_{m0} + Prob(k=1 \mid d_{m1}, m1)q_{m1}$$

(Equation 2)

According to one embodiment, by Equation 2 the analysis module 103 computes a probability a comparison is mated (e.g., the inputs of the comparison are derived from the same subject) given the distance score d and mask state m. In various embodiments, the output of Equation 2 (e.g., Prob(k=1|$d_{m0}$,$d_{m1}$,m)) is a probability ranging between 0 and 1. In one or more embodiments, calibration performed using Equation 2 provides a non-mated score distribution with approximate mean 0.2 and a mated score distribution with approximate mean 0.8. According to one embodiment, calibration performed using Equation 2 demonstrates an equal error rate (EER) threshold operating point of about 0.5.

In one or more embodiments, the analysis module 103 computes a calibrated score in the form of a posterior probability (e.g., Prob(k=1|d,m)) according to Equation 3. In various embodiments, $f$ is a cubic interpolation function with the input-output values defined by Table 2, in which one or more of the following conventions may apply:

1) $\epsilon$ is a computer-tolerable precision value (e.g., a miniscule value) to prevent over or under flowing;

2)

$$\text{logit}(x) = \log\left(\frac{x}{1-x}\right);$$

3) $\Delta_m$ is the EER operating point estimated from the distance scores produced by images with the face covering state mask, which is either with face covering, mask1 or without, mask0;

4) $\mu_{mated|m}$ is the mean mated score of probe images having the face covering state, m (could be with face covering, m1 or without face covering, m0);

5) $\mu_{nonmated|m}$ is the mean non-mated score of probe images having the face covering state, mask (could be with face covering, m1 or without face covering, m0); and 6) $\max_d$ is the maximum observable distance scores, such that $0 \leq d \leq \max_d$.

According to one embodiment, the function $f(\cdot, m)$ indicates that the posterior probability is a function of the face covering state m. In various embodiments, depending on the mask state, the interpolation function $f$ takes different values of $\{\mu_{(mated|m)}, \mu_{(nonmated|m)}, \Delta_m\}$, which are the mean value of mated distance score, the mean value of non-mated distance score and the threshold at the EER operating point. In at least one embodiment, the input of the function $f$ and its output values must be in the logit domain. In one or more embodiments, because the output off is a logit, the analysis module 103 apply a sigmoid function of the form $$\text{sigmoid}(x) = \frac{1}{1+\exp(-x)}$$

to obtain a proper probability (e.g., in a range of 0 to 1).

$$Prob(k=1|d, m) = \text{sigmoid}\left(f\left(\log\left(\frac{\max_d - d}{d}\right), m\right)\right)$$ (Equation 3)

| Input | Output |
| --- | --- |
| $\log\left(\frac{\max_d - \epsilon}{\epsilon}\right)$ | $\text{logit}(1 - \epsilon)$ |
| $\log\left(\frac{\max_d - \mu_{mated|m}}{\mu_{mated}}\right)$ | $\text{logit}(0.8)$ |

| Input | Output |
|---|---|
| $\log\left(\dfrac{\max_d - \Delta_m}{\Delta}\right)$ | logit(0.5) |
| $\log\left(\dfrac{\max_d - \mu_{nonmated\|m}}{\mu_{nonmated}}\right)$ | logit(0.2) |
| $\log\left(\dfrac{\max_d - (\max_d + \epsilon)}{(\max_d + \epsilon)}\right)$ | logit($\epsilon$) |

Table 2. Mapping Functions for Posterior Probability Computation

In one or more embodiments, the analysis module 103 performs calibration according to one or more rules. In at least one embodiment, the analysis module 103 determines a minimum similarity metric (e.g., such as a minimum distance metric) from two or more similarity metrics. A first similarity metric of the two or more similarity metrics can include a similarity metric derived from a comparison between a probe facial FXR and an enrollment facial FXR derived from a facial image including a face covering. A second similarity metric of the two or more similarity metrics can include a similarity metric derived from a comparison between the probe facial FXR and an enrollment facial FXR derived from a facial image excluding a face covering. In one or more embodiments, the analysis module 103 performs calibration according to Equation 4 in which $d_{min}$ refers to a minimum similarity metric.

Calibrated Score=Prob($k$=1|$d_{min}$,$m$0)$q_{m0}$+Prob
($k$=1|$d_{min}$,$m$1)$q_{m1}$    (Equation 4)

In at least one embodiment, in place of calibration, the analysis module 103 determines an overall similarity score according to rules described by Equation 5. For example, based on a face cover probability, the analysis module 103 determines an overall similarity score as either a similarity metric derived from a comparison between a covered face probe FXR and a covered face enrollment FXR or a similarity metric derived from a comparison between the covered face probe FXR and an uncovered face enrollment FXR.

$$\text{Calibrated Score} = \begin{array}{l} Prob(k = 1|d_{min}, m0) \text{ if } q_{m1} \geq 0.5 \\ Prob(k = 1|d_{min}, m1) \text{ Otherwise} \end{array} \text{ (Equation 5)}$$

In various embodiments, the analysis module 103 applies one or more algorithms, techniques, and/or machine learning models to evaluate and estimate one or more image factors. Non-limiting examples of image factors include brightness, contrast, resolution, angle, subject matter classifications (e.g., human, face, eyes, ears, nose, mouth, and features thereof), and liveness. Liveness evaluation and estimation can be performed according to one or more embodiments described in the incorporated disclosures, such as, for example, U.S. patent application Ser. No. 16/855,606, filed Apr. 22, 2020, titled "SYSTEMS AND METHODS FOR PASSIVE-SUBJECT LIVENESS VERIFICATION IN DIGITAL MEDIA.

In various embodiments, the analysis module 103 can generate scores for measuring image factors and can compare image factor scores to predetermined thresholds for purposes of ensuring image quality and security. For example, from an input image, the analysis module 103 can generate and compare a brightness score to a predetermined minimum brightness threshold and a predetermined maximum brightness threshold to ensure the image demonstrates brightness within an acceptable range. In another example, from an input image the analysis module 103 generates a score for estimating a likelihood that an image includes a face. In the same example, the analysis module 103 compares the likelihood score to a predetermined threshold (e.g., which may be a Boolean threshold or a scaled, integer-based threshold) for purposes of determining whether the input image includes a face.

In various embodiments, the analysis module 103 generates one or more machine learning models for analyzing biometric data (e.g., including biometric images, such as facial images). In one or more embodiments, the analysis module 103 generates and trains machine learning models to detect faces and/or facial features in digital images. For example the analysis module 103 trains a machine learning model to analyze digital images and determine whether the images include or exclude a face (e.g., and/or particular facial features, such as mouth eyes, nose). In this example, the analysis module 103 can train the machine learning model using a training dataset that includes a first subset of images including faces and a second subset of images that exclude faces. In another example, the analysis module 103 trains a machine learning model to estimate a posterior probability that a face image includes a face covering. In this example, the analysis module 103 can train the machine learning model using a training dataset that includes a first subset of images including face images with face coverings and a second subset of face images that exclude face coverings. In another example, the analysis module 103 generates a machine learning model that performs "image painting" by receiving an input covered face image and predicting an appearance of obfuscated anatomy in the image (e.g., nose, mouth, facial contours, etc.) for purposes of biometric matching. In this example, the analysis module 103 can train the machine learning model using one or more datasets including labeled and unlabeled facial images that include and exclude facial coverings.

In various embodiments, the analysis module 103 includes one or more machine learning models and/or applies one or more policies to classify input images based on a type of face covering included in the image. For example, the analysis module can classify an input facial image as including a surgical face mask or a Niqāb. In at least one embodiment, the biometric system 100 performs biometric matching processes by utilizing mask type-matched enrollment FXRs. For example, when a probe image includes a face covered by a Niqāb, the biometric system 100 utilizes one or more enrollment FXRs derived from an enrollment image (e.g., or image derived therefrom) that includes a Niqāb. In the same example, when a probe image includes a face covered by a respirator, the biometric system utilizes one or more enrollment FXRs derived from an enrollment image that includes a face covered by a respirator.

In at least one embodiment, the analysis module 103 generates mapping data that describes positions of one or more image features or properties. In one or more embodiments, the analysis module 103 detects and generates coordinates for describing the position and orientation of a face and facial features, such as, for example, eyes, ears, nose, and mouth. In various embodiments, the analysis module 103 analyses a facial image and generates one or more of left eye center coordinates, right eye center coordinates, mouth corner coordinates, ear coordinates, nose coordinates, and facial boundary coordinates. In one or more embodiments, the analysis module 103 estimates an orientation of one or more biometric features, such as, for example, an orientation of a head, a face, a mouth, or an eye. In one example, the analysis module 103 analyzes an image to generate a head pose estimation (e.g., including mapping data defining an absolute or relative orientation of a head in the image).

In one or more embodiments, the computing environment 101 includes an image generator 115 that generates and modifies various images described herein. In at least one embodiment, the image generator 115 performs image processes including, but not limited to, image cropping, image alignment, image brightness adjustment, image contrast adjustment, image warping, image modeling, and image modification (e.g., adding or removing content to or from an image). In one example, the image generator 115 receives an input image and mapping data defining a face within the input image. In the same example, based on the mapping data, the image generator 115 crops the input image to generate a cropped facial image that centers on (e.g., or only includes) the face. In the same example, the image generator 115 aligns the face in the cropped facial image according to a predetermined facial template (e.g., for purposes of providing standardized image formats to support matching accuracy and precision).

In at least one embodiment, the image generator 115 adds artificial face coverings (e.g., digital representations of face coverings) to facial images to generate covered facial images. In one or more embodiments, the image generator 115 uses one or more augmented reality techniques, algorithms, or machine learning models to apply a three-dimensional face covering to an image (e.g., to a head or face included therein). In at least one embodiment, the image generator 115 uses an orientation estimation (e.g., such as a head pose estimation) as an input to application of the three-dimensional face covering. In various embodiments, the image generator 115 generates a cropped and aligned facial image and adds a face covering to the cropped and aligned facial image. In some embodiments, the image generator 115 crops and aligns facial images (e.g., and fits facial coverings thereto) such that ears of the facial image are included. In at least one embodiment, cropped and aligned facial images of the image generator 115 exclude ears.

In one or more embodiments, prior to applying the face covering, the image generator 115 transforms a cropped and aligned facial image using one or more image warping techniques, algorithms, or machine learning models. In at least one embodiment, image warping includes normalizing one or more coordinates of biometric features present in an image. In one example, the image generator 115 achieves image normalization by normalizing variable coordinates of biometric features (e.g., eyes, mouth, nose, mouth, mouth corners, etc.) to fixed coordinates. The fixed coordinates may be predetermined coordinates stored in the data store 105 and may be determined based on a predetermined facial template (e.g., that includes mapping data defining optimal normalized orientations of a face and/or features thereof). In at least one embodiment, following normalization, the image generator 115 fits an artificial face covering to the cropped and aligned facial image according to normalized coordinates of one or more facial features. In one or more embodiments, the image generator 115 adds a face covering to a facial image such that the face covering covers a nose in the facial image.

In at least one embodiment, the computing environment 101 includes a data store 105 for storing various data related to the functions and processes of the biometric system 100.

The data store 105 can be representative of a plurality of databases as can be appreciated. In at least one embodiment, the data store 105 is an elastic storage resource, such as, for example, a cloud-based storage framework. In one or more embodiments, the data store 105 includes one or more remote servers that are separated from, in communication with, and controlled by the computing environment 101. In one or more embodiments, the data store 105 includes, but is not limited to, enrollment data 107, thresholds 109, and templates 111. In some embodiments, one or more of enrollment data 107, thresholds 109, and templates 111 are also, or alternatively, stored in storage 114 of the computing device 106.

According to one embodiment, the enrollment data 107 includes parameters for generating fixed-size representations of biometric images and for generating identity data associated with a subject from which one or more biometric images are derived. In one or more embodiments, identity images and biometric images are outputs from a biometric enrollment process, such as, for example, an embodiment of the enrollment processes 200, 900 (see FIGS. 2 and 9) described herein. In various embodiments, the identity data includes a facial image extracted from an identity document, such as a passport or driver's license. In some embodiments, the identity data includes metadata extracted from the identity data or otherwise input to the system 101. The metadata may include, but is not limited to, nationality, legal name, birth date, birthplace, record of travel (e.g., a time-series log of locational information), and other information. In some embodiments, potentially sensitive identity data, such as, for example, unencrypted PII, is not stored at the data store 105 (e.g., or is only stored in an encrypted format or as unlinkable representation, such as a FXR or a privacy-secured token).

In at least one embodiment, identity data refers to an identifier assigned to one or more biometric representations. For example, identity data can refer to an identifier assigned to an enrollment FXR with which a particular subject is associated. The identifier can be pseudo-randomly generated and exclude any information that may uniquely identify a subject with which the identifier is associated. In one or more embodiments, enrollment data 107 includes one or more datasets for training machine learning models described herein. In one example, the enrollment data 107 includes training datasets for face detection, face cover detection, facial feature detection, image alignment, image cropping, and face cover application.

In one or more embodiments, enrollment data 107 includes one or more enrollment biometric representations, such as, for example, enrollment fixed-sized representations (FXRs) and privacy-secured tokens derived therefrom. In one example, enrollment data 107 includes a first enrollment FXR derived from a face image excluding a face covering and includes a second enrollment FXR derived from a face image including a face covering, and the first and second enrollment FXRs are associated with the same subject. In various embodiments, enrollment data 107 includes a plurality of mated and unmated enrollment FXRs. In at least one embodiment, enrollment data 107 includes mated pairs of face cover-including and face cover-excluding enrollment FXRs. In at least one embodiment, the biometric system 100 stores outputs of enrollment processes as enrollment data 107. In various embodiments, the biometric system 100 retrieves enrollment biometric representations from enrollment data 107 to perform comparisons between the enrollment representations and probe representations for purposes of biometric identification or biometric verification.

In at least one embodiment, biometric enrollment representations are stored in one or more registries. The computing environment 101 can delete biometric representations from the registries and, thereby, "cancel" the link between the biometric representations and subjects represented thereby. According to one embodiment, the unlinkability and cancellability of the present biometric representations advantageously improves security and reduces a likelihood that biometric data or other PII can be accessed, viewed, or generated by an attacker.

According to one embodiment, thresholds 109 includes one or more threshold values for evaluating outputs of various functions, such as, for example, image analyses and similarity comparisons. In various embodiments, thresholds 109 include values for defining one or more thresholds described herein. Non-limiting examples of thresholds include similarity thresholds, liveness thresholds, brightness thresholds, contrast thresholds, blurriness thresholds, face detection thresholds (e.g., and other thresholds for detecting biometric features), face cover detection thresholds, equal error rate thresholds, and calibration thresholds.

In some embodiments, templates 111 include templates for configuring image captures of various biometric features including, but not limited to, faces, eyes, hands, fingers, palms, gait, behavioral biometrics, and other biometric features and combinations thereof. In some embodiments, templates 111 include one or more templates for aligning and cropping images. For example, templates 111 include face templates for aligning facial images and for cropping images to a face included therein. In at least one embodiment, templates 111 include predetermined coordinate sets for normalizing and adjusting coordinates of one or more image features (e.g., such as a face or features thereof).

Exemplary Processes

Figure 2:
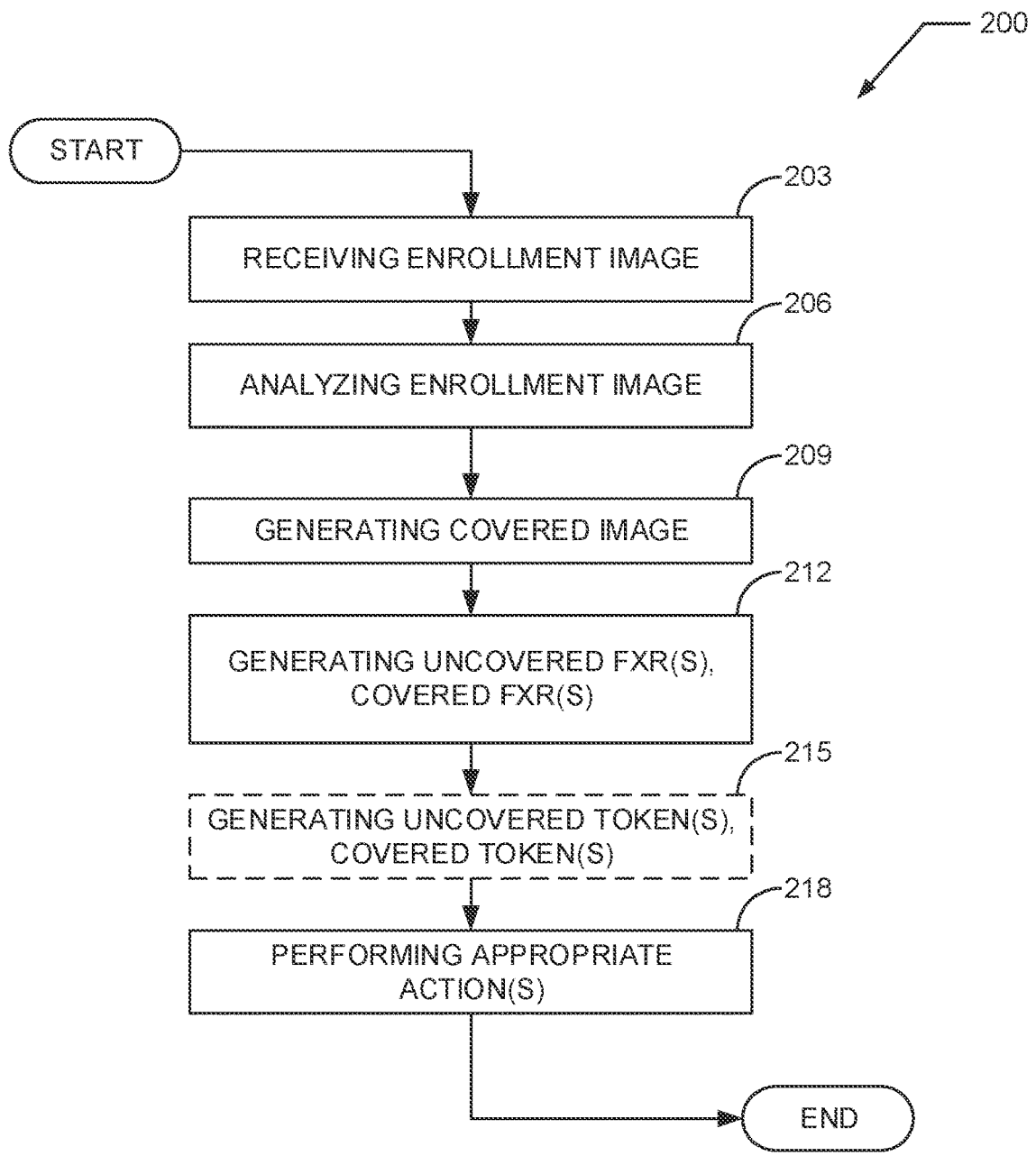
FIG. 2 is a flowchart of an exemplary biometric enrollment process, according to one embodiment of the present disclosure.

FIG. 2 shows an exemplary enrollment process 200, according to one embodiment. As will be understood by one having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown.

At step 203, the process 200 includes receiving one or more enrollment images (e.g., a digital image of a live subject, including the subject's face). The computing environment can receive the enrollment image from the computing device 106. In at least one embodiment, the enrollment image includes a subject's face without a face covering. In some embodiments, receiving the enrollment image includes causing the image application 113 to prompt a subject to capture an image of their face without a face covering. For example, the image application 113 causes the computing device 106 to render an instruction for capturing an uncovered face image and/or renders an alignment template for capturing a face image at a predetermined orientation.

In one or more embodiments, receiving the enrollment image includes receiving a transmission that includes the enrollment image and additional information, such as, for example, metadata indicating a time and location at which the image was captured. Non-limiting examples of additional information include identifiers associated with the subject, the image application 113, and/or the computing device 106.

At step 206, the process 200 includes analyzing the enrollment image. In one or more embodiments, analyzing the enrollment image includes the analysis module 103 evaluating and quantifying one or more image factors. In various embodiments, the analysis module 103 performs face detection by estimating a likelihood that the enrollment image includes a face and comparing the likelihood to a predetermined face detection thresholds. Non-limiting examples of evaluations and quantities generated by the analysis module 103 include brightness, contrast, blurriness, sharpness, resolution, orientation, and liveness. In some embodiments, the analysis module 103 determines if one or more image factors fail to satisfy one or more image factor thresholds. In response to determining an enrollment image fails to satisfy one or more image factor thresholds, the analysis module 103 can suspend the process 200 or cause the image application 113 to instruct the subject to capture a new enrollment image (e.g., and the instruction may include guidance for providing a suitable enrollment image, such as guidance for improving lighting, alignment, including a face, removing a face covering, etc.). In at least one embodiment, the analysis module 103 analyzes an enrollment image and generates data for use in subsequent steps of the process 200 (or other processes described herein). In one or more embodiments, the analysis module 103 generates a head pose estimation based on the enrollment image. In various embodiments, the analysis module 103 generates mapping data including coordinates of one or more biometric features in the enrollment image, such as, for example, facial contours, eye center points, mouth corner points, or a nose center point. In at least one embodiment, the image generator 115 aligns and/or crops the enrollment image based on the head pose estimation and/or the mapping data to generate a cropped and/or aligned enrollment image.

At step 209, the process 200 includes generating a covered image based on the enrollment image. In at least one embodiment, generating the covered image includes applying an artificial mask to a face included in the enrollment image (e.g., or to a cropped, aligned facial image derived therefrom). In various embodiments, generating the covered image includes fitting a three-dimensional virtual face covering to the uncovered face image based on a head pose estimation derived from the uncovered face image. The image generator 115 can use any suitable fitting technique to generate the covered image. In one or more embodiments, generating the covered image includes generating a cropped face image from the uncovered face image by cropping the face image according to a normalized coordinate set. In various embodiments, generating the covered image includes aligning and/or warping the cropped face image according to a normalized coordinate set. The normalized coordinate set can include normalized coordinates for one or more biometric features including but not limited to facial contours, eye center points, mouth corner points, or a nose center point. According to one embodiment, the image generator 115 fits a face covering to the uncovered face image such that the face covering obfuscates a nose of the face and anatomy inferior to the nose (e.g., philtrum, mouth, etc.), and such that the ears, if present, are viewable in the output covered image.

In one or more embodiments, the artificial representation of the face covering is derived from a particular physical face covering. Non-limiting examples of physical face coverings include surgical masks (e.g., such as N95 face masks), fabric masks, face shields, Niqābs, and respirators. In at least one embodiment, the image generator 115 generates multiple face-covered images by generating face covered images with different artificial face cover representations. For example, the image generator 115 generates a first covered image by adding an artificial representation of a Niqāb to a first instance of the enrollment image, and the image generator 115 generates a second covered image by adding an artificial representation of a surgical mask to a second instance of the enrollment image.

At step 212, the process 200 includes generating a fixed-size representation (FXR) based on the enrollment image (e.g., or a cropped, aligned uncovered face image derived therefrom) and generating a FXR based on the covered image (e.g., or a cropped, aligned covered face image derived therefrom). The biometric system 100 can generate fixed size representations according to one or more embodiments described in:

U.S. application Ser. No. 17/109,693, filed Dec. 2, 2020, titled "SYSTEMS AND METHODS FOR PRIVACY-SECURED BIOMETRIC IDENTIFICATION AND VERIFICATION";

U.S. Patent Application No. 62/942,311, filed Dec. 2, 2019, titled "SYSTEMS AND METHODS FOR PRIVACY-SECURED BIOMETRIC IDENTIFICATION AND VERIFICATION";

U.S. patent application Ser. No. 16/841,269, filed Apr. 6, 2020, titled "SYSTEMS AND METHODS FOR LOSSY BIOMETRIC REPRESENTATIONS"; and U.S. Patent Application No. 62/829,825, filed Apr. 5, 2019, titled "THE EVERGREEN HASH," the disclosures of which are incorporated herein by reference in their entireties.

In some embodiments, generating the face covered FXR and the face uncovered FXR includes encoding data that defines each image (e.g., or a transformed version thereof, such as a cropped and aligned version of the image) and generating a FXR based on the encoded data (e.g., or raw image, in alternate embodiments). In one or more embodiments, encoding the data includes passing the capture (e.g., or data obtained therefrom) through one or more encoders. In one example, the computing environment 101 includes a minutiae encoder that encodes facial minutiae data, or other data, into a FXR. In one example, the computing environment 101 includes a string encoder that encodes string-formatted PII into an embedded vector (e.g., an identity data FXR). The biometric system 100 can include an encoder for translating any biometric capture or non-biodata to a FXR.

At step 215, the process 200 includes generating an uncovered token based on the FXR derived from the enrollment image (e.g., or from a cropped, aligned uncovered facial image) and generating a covered token based on the FXR derived from the covered image (e.g., or from a cropped, aligned covered facial image).

The biometric system 100 can generate the privacy-secured token according to one or more embodiments described in the incorporated references, such as, for example, U.S. patent application Ser. No. 16/841,269, filed Apr. 6, 2020, titled "SYSTEMS AND METHODS FOR LOSSY BIOMETRIC REPRESENTATIONS," and U.S. Patent Application No. 62/829,825, filed Apr. 5, 2019, titled "THE EVERGREEN HASH."

In one or more embodiments, generating the privacy-secured token includes normalizing a FXR, discretizing the FXR to an 8-bit signed integer (e.g., via a suitable technique, such as quantization), and permuting the FXR based on a pseudorandom key (e.g., and, in some embodiments, and non-biodata, such as a PIN). In at least one embodiment, generating the privacy-secured token includes multiplying the permuted FXR by a pseudorandom projection matrix (e.g., generated based on the pseudorandom key), permuting the projected FXR based on the pseudorandom key, normalizing the permuted, projected FXR, quantizing the normalized FXR to discretize the FXR, and, thereby, generating the privacy-secured token as an 8-bit signed integer. In some embodiments, generating the privacy-secured token includes encrypting non-biodata using the pseudorandom key, normalizing and/or rescaling the encrypted non-biodata, discretizing the normalized non-biodata to an 8-bit signed integer, and performing the first permutation of the FXR using the discretized non-biodata as an additional input.

According to one embodiment, the privacy-secured token is cancellable (e.g., the token can be revoked and the subject can be re-enrolled) and satisfies various security standard such as irreversibility and unlinkability, as well as biometric processing requirements (e.g., the token preserves biometric matching performance at scale and speed without significant impact to matching accuracy).

At step 218, the process 200 includes performing one or more appropriate actions. Non-limiting examples of appropriate actions include storing the face covered FXR and the face uncovered FXR (e.g., or tokens derived therefrom) at the data store 105, transmitting an alert to the computing device 106 (e.g., or another external system), providing the computing device 106 and/or the subject associated with the enrollment image access to one or more physical and/or digital environments, hashing the face uncovered FXR and the face covered FXR to generate two or more hashes, packing the face uncovered FXR and the face covered FXR into a pseudonymous identifier, and generating scannable media including the face uncovered FXR and the face covered FXR (e.g., as raw FXRs, as hashes thereof, or as a pseudonymous identifier). In one example, the computing environment 101 stores the face uncovered FXR and the face covered FXR as enrollment data 107. In this example, the computing environment 101 stores the face uncovered FXR and the face covered FXR in one or more registries for future retrieval in verification and identification processes. In another example, the computing device 106 receives and stores the face uncovered FXR and the face covered FXR in storage 114.

Figure 3:
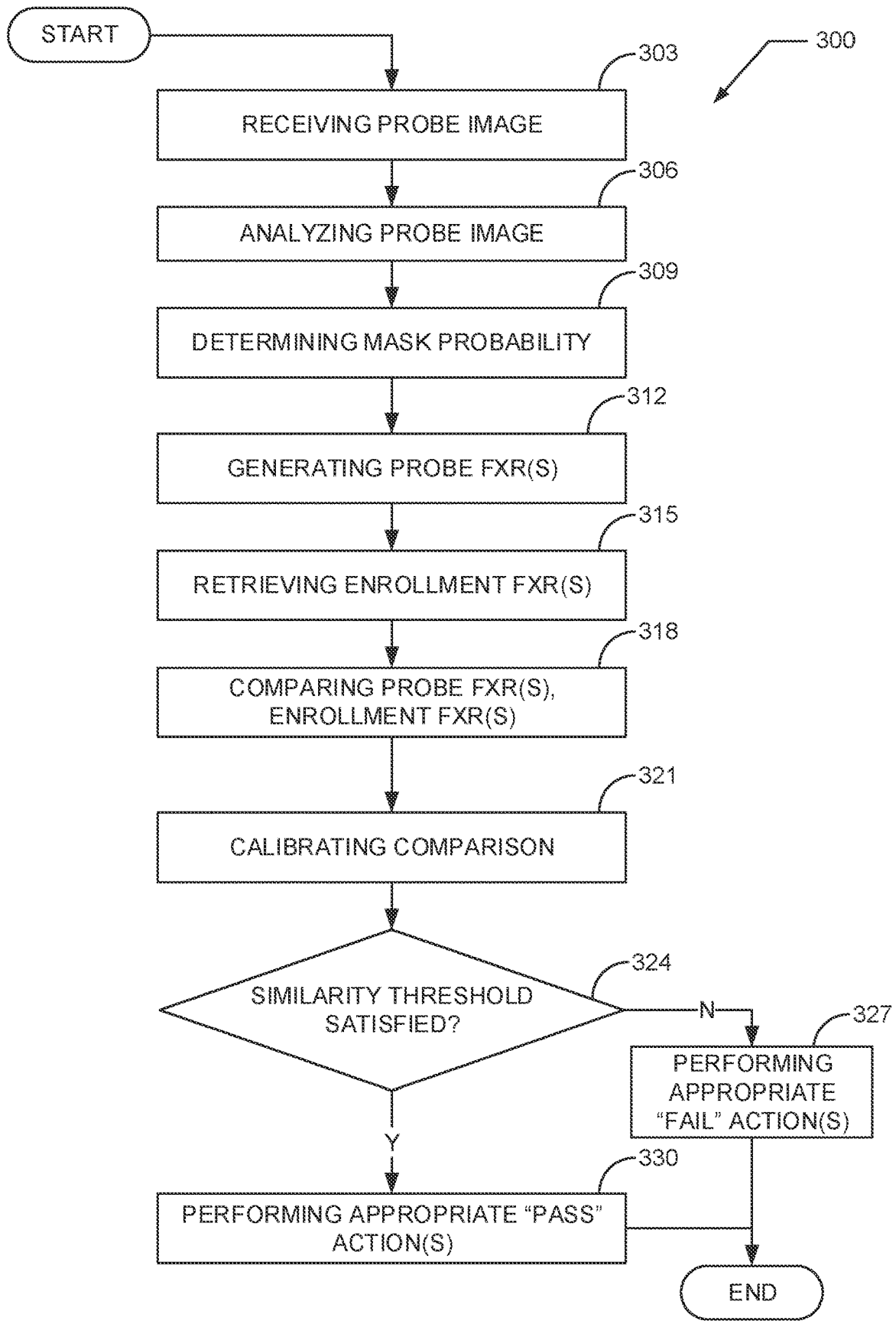
FIG. 3 is a flowchart of an exemplary biometric verification process, according to one embodiment of the present disclosure.

FIG. 3 shows an exemplary biometric verification process 300. In some embodiments, the process 300 is performed as a biometric identification as further described herein.

At step 303, the process 300 includes receiving a probe image. The computing environment can receive the probe image from the computing device 106. In at least one embodiment, the probe image includes a subject's face with a face covering. In some embodiments, receiving the probe image includes causing the image application 113 to prompt a subject to capture an image of their face with a face covering. For example, the image application 113 causes the computing device 106 to render an instruction for capturing a covered face image and/or renders an alignment template for capturing a face image at a predetermined orientation. In at least one embodiment, the biometric system 100 is agnostic as to a face cover status of the probe image. In other words, the biometric system 100 may perform biometric verification and identification processes with sufficient speed and accuracy using covered face probe images or uncovered face probe images. In one or more embodiments, receiving the probe image includes receiving a transmission that includes the probe image and additional information, such as, for example, metadata indicating a time and location at which the image was captured or an identifier for enabling retrieval of enrollment representations for comparison.

At step 306, the process 300 includes analyzing the probe image. In at least one embodiment, the analysis module 103 performs step 306 similar to step 206 of the process 200 (FIG. 2). In one or more embodiments, the analysis module 103 evaluates and quantifies one or more image factors of the probe image to ensure sufficient quality and subject matter. In one example, the analysis module 103 performs a face detection analysis to verify that the probe image includes a face. In another example, the analysis module 103 analyzes the probe image to verify that the probe image demonstrates sufficient liveness, brightness, resolution, contrast, and/or other suitable image factors. In some embodiments, in response to the analysis module 103 determining that the probe image lacks one or more sufficient image factors, the process 300 is suspended or the process 300 returns to step 303. In one example, in response to the analysis module 103 determining that the probe image lacks one or more sufficient image factors, the computing environment 101 transmits an alert to the computing device 106 that includes one or more reasons why the probe image demonstrates insufficient quality and/or provides one or more instructions for capturing a suitable probe image.

In various embodiments, the analysis module 103 generates a head pose estimation and/or mapping data that defines one or more anatomical features of the probe image (e.g., face contours, eyes, ears, chin, mouth, nose, etc.). In one or more embodiments, the image generator 115 crops and/or aligns the probe image based on the head pose estimation and/or the mapping data to generate a cropped and/or aligned probe image.

At step 309, the process 300 includes determining a probability that a face in the probe image includes a face covering (e.g., or any covering that obfuscates the nose and inferior anatomy, such as the mouth and chin). In at least one embodiment, the probability is a likelihood that particular anatomy in the probe image is obfuscated. The particular anatomy can include one or more of, but is not limited to, a chin, a nose, a mouth, ears, and facial contours (for example, a jawline). In some embodiments, the probability is referred to as a "mask probability." In one or more embodiments, the analysis module 103 generates and executes one or more trained machine learning models to estimate a likelihood (for example, a posterior probability) that the probe image includes a face covering. In at least one embodiment, the computing environment 101 stores the likelihood of face covering inclusion as enrollment data 107. In some embodiments, the analysis module 103 compares the probability to a predetermined threshold (for example, a minimum mask probability threshold) and determines whether the face in the probe image includes a face covering. In at least one embodiment, in response to determining that the face in the probe image excludes a face covering, the computing environment 101 performs biometric comparisons of the process 300 using one or more enrollment FXRs derived from face images that exclude face coverings (e.g., as opposed to using enrollment FXRs derived from face images that include face coverings and from face images that exclude face coverings).

At step 312, the process 300 includes generating a probe fixed-size representation (FXR) based on the probe image (e.g., or a cropped, aligned, probe facial image derived therefrom). In at least one embodiment, step 312 is performed similar to step 212 of the process 300. In some embodiments, the computing environment 101 further transforms the probe FXR to a probe privacy-secured token (e.g., in instances where biometric verification or identification is performed using enrollment tokens). The biometric system 100 can generate the probe token in a process similar to step 215 of the process 200.

At step 315, the process 300 includes retrieving two or more enrollment FXRs (e.g., or privacy-secured tokens). In some embodiments, when the process 300 is performed for purposes of biometric identification, a plurality of paired F×R images are retrieved (e.g., each pair including a covered FXR and an uncovered FXR derived from the same subject). In at least one embodiment, the two or more enrollment FXRs include a covered face FXR and an uncovered face FXR. In one or more embodiments, the analysis module 103 retrieves the two or more enrollment FXRs based on an identifier associated with the probe image, the subject represented thereby, or the computing device 106.

At step 318, the process 300 includes comparing the probe FXR to each of the two or more enrollment FXRs. In at least one embodiment, comparing the FXRs includes computing a similarity score, such as, for example, a squared Euclidean distance, $L^2$ norm metric, cosine similarity score, or match probability metric (e.g., such as a posterior probability score). The analysis module 103 can perform the comparisons according to one more embodiments described in the incorporated reference, such as, for example, U.S. application Ser. No. 17/109,693, filed Dec. 2, 2020, entitled "SYSTEMS AND METHODS FOR PRIVACY-SECURED BIOMETRIC IDENTIFICATION AND VERIFICATION," and U.S. Patent Application No. 62/942,311, filed Dec. 2, 2019, entitled "SYSTEMS AND METHODS FOR PRIVACY-SECURED BIOMETRIC IDENTIFICATION AND VERIFICATION."

At step 321, the process 300 includes calibrating one or more comparisons of step 318. In at least one embodiment, at step 321, the process 300 includes calibrating a first similarity score and a second similarity score to generate a calibrated similarity score. In various embodiments, in instances of biometric identification via the process 300, the analysis module 103 ranks of a plurality of mated similarity score pairs (e.g., mated referring to the mated covered and uncovered face enrollment FXRs used to generate the similarity scores). In one or more embodiments, the analysis module 103 determines a top-ranked pair of similarity scores and subjects the top-ranked similarity score pair to calibration and/or evaluation.

In one or more embodiments, the analysis module uses one or more face covering probabilities (e.g., generated at step 309) as an input to one or more calibration functions. In various embodiments, the analysis module 103 performs calibration according to any of Equations 1-5 (e.g., including one or more rules associated therewith). For example, via Equation 1, the analysis module 103 calibrates the similarity scores to generate a log-likelihood ratio that the probe FXR and the two or more enrollment FXRs are mated. In another example, via Equation 2, the analysis module 103 calibrates the similarity scores to generate a direct posterior probability estimation that the probe FXR and the two or more enrollment FXRs are mated.

In some embodiments, the process 300 does not perform calibration and the analysis module determines a particular similarity score of the two or more similarity scores as an overall similarity score for supporting verification or identification determinations. In one example, the analysis module 103 determines an overall similarity score according to Equation 6 in which $d_{m0}$ represents a similarity score derived from the probe FXR and the uncovered face enrollment FXR, and in which dog represents a similarity score derived from the probe FXR and the covered face enrollment FXR. According to one embodiment, 0.5 represents an EER operating threshold.

$$\text{Calibrated Score} = \begin{matrix} d_{m0} & \text{if } q_{m1} \geq 0.5 \\ d_{m1} & \text{Otherwise} \end{matrix} \qquad \text{(Equation 6)}$$

In another example, the analysis module 103 determines an overall similarity score to be a minimum score of the two or more similarity scores.

At step 324, the process 300 includes determining whether the calibrated similarity score or overall similarity score satisfies one or more predetermined thresholds. In one or more embodiments, in response to determining the one or more predetermined thresholds are not satisfied, the process 300 proceeds to step 327. In at least one embodiment, in response to determining the one or more predetermined thresholds are satisfied, the process 300 proceeds to step 330.

At step 327, the process 300 includes performing one or more predetermined "fail" actions. In one example, a fail action includes suspending access to services and functions of the computing environment 101 for the computing device 106 (e.g., or the subject) associated with the probe image. In another example, a fail action includes performing an enrollment process (e.g., such as process 200 shown in FIG. 2) to enroll the subject into the biometric system 100 by storing the non-matching probe FXR in enrollment data 107 as an enrollment FXR of the subject. In another example, a fail action includes transmitting an alert to the computing device 106 associated with the probe image and/or another computing device 106 (e.g., or other external system). In this example, the alert can indicate that the probe image could not be verified or identified. In another example, a fail action includes preventing a subject associated with the probe image from accessing a digital environment (e.g., such as a particular network address) or a physical environment (e.g., such as a port of entry or a door).

At step 330, the process 300 includes performing one or more predetermined "pass" actions. In one example, a pass action includes maintaining access to services and functions of the computing environment 101 for the computing device 106 (e.g., or the subject) associated with the probe image. In another example, a pass action includes performing an enrollment process (e.g., such as process 200 shown in FIG. 2) to re-enroll the subject into the biometric system 100 by storing the non-matching probe FXR in enrollment data 107 as an additional enrollment FXR of the subject. In another example, a pass action includes transmitting an alert to the computing device 106 associated with the probe image and/or another computing device 106 (e.g., or other external system). In this example, the alert can indicate that the probe image was successfully verified or identified. In the same example, the alert can include the calibrated similarity score, thereby providing a reviewable record of the probe image matching outcome. In another example, a pass action includes preventing a subject associated with the probe image from accessing a digital environment (e.g., such as a particular network address) or a physical environment (e.g., such as a port of entry or a door).

Figure 4:
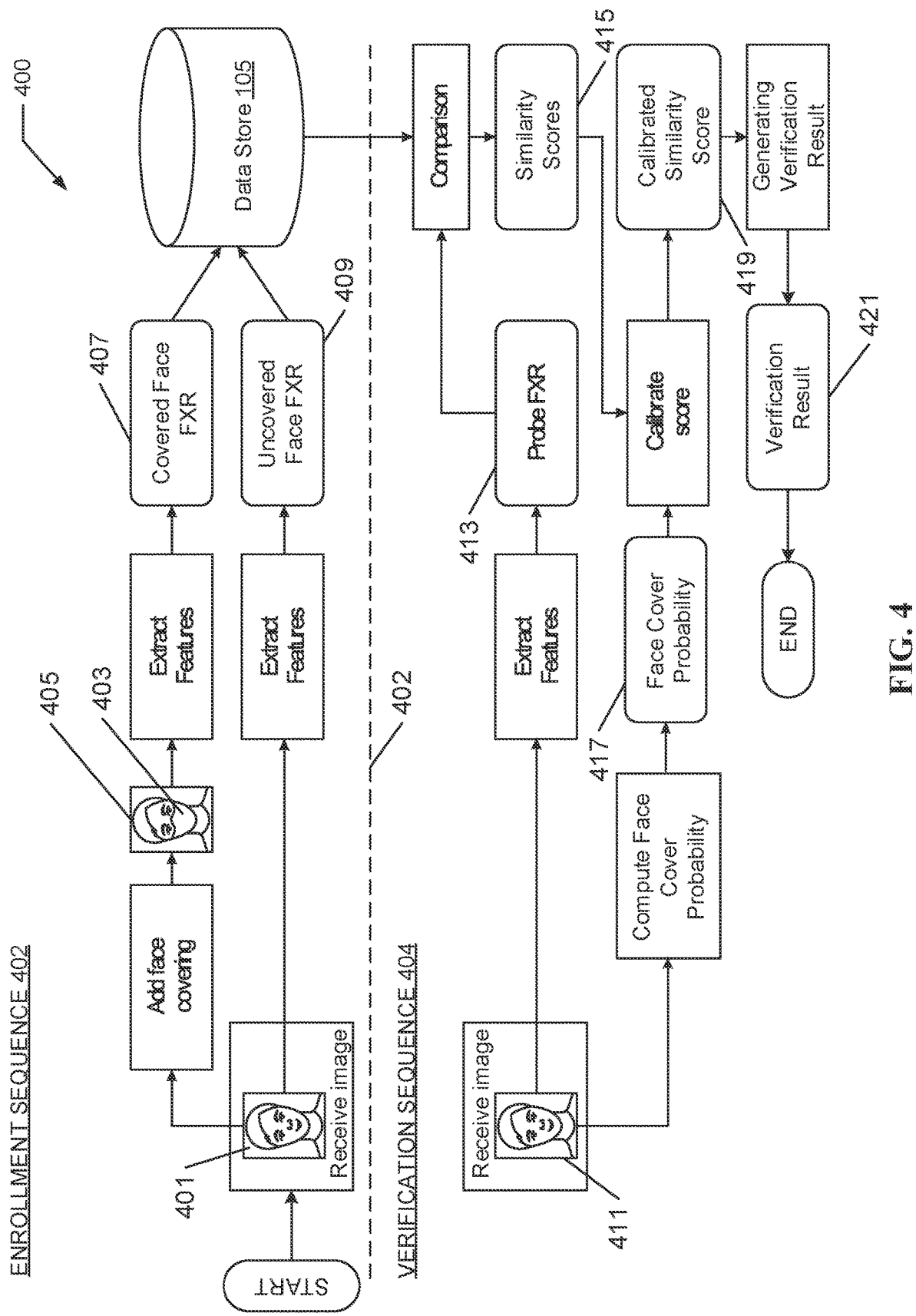
FIG. 4 is a diagram of an exemplary biometric enrollment and verification sequence, according to one embodiment of the present disclosure.

FIG. 4 is a diagram of an exemplary biometric enrollment sequence 402 and an exemplary verification sequence 404. According to one embodiment, a reference line 402 denotes the enrollment sequence 401 and the verification sequence 403.

In at least one embodiment, the enrollment sequence 402 includes receiving an uncovered facial image 401. In one or more embodiments, the enrollment sequence 402 includes adding an artificial face covering 403 to the uncovered facial image 401, thereby generating a covered facial image 405. In various embodiments, the enrollment sequence 402 includes extracting features from the uncovered facial image 401 and the covered facial image 405, and includes generating a covered face FXR 407 and an uncovered face FXR 409 (e.g., or privacy-secured tokens derived therefrom) based on the extracted features. In one or more embodiments, the enrollment sequence 402 includes enrolling a subject associated with the uncovered facial image 401 into the biometric system 100 by storing the covered face FXR 407 and the uncovered face FXR 409 at the data store 105 as enrollment FXRs (for example, as enrollment data 107 arranged into one or more registries).

In one or more embodiments, the verification sequence 404 includes receiving a probe facial image 411. In at least one embodiment, the verification sequence 404 includes extracting features from the probe facial image 411 and generating a probe FXR 413 based on the extracted features. In various embodiments, the verification sequence 404 includes comparing the probe FXR 413 to the covered face FXR 407 and the uncovered face FXR 409 to generate similarity scores 415. In at least one embodiment, the verification sequence 404 includes computing a face cover probability 417 based on the probe facial image 411. In one or more embodiments, the verification sequence 404 includes calibrating the similarity scores 415 based on the face cover probability 417 (e.g., and according to one or more techniques and/or equations described herein) to generate a calibrated similarity score 419. In at least one embodiment, the verification sequence 404 includes generating a verification result 421, for example, by comparing the calibrated similarity score 419 to one or more predetermined verification thresholds.

Exemplary Experimental Results

The following section describes one or more experimental tests, and results thereof, performed on one or more embodiments of systems and methods described herein. The descriptions therein are provided for the purposes of illustrating various elements of the systems and methods (e.g., as observed in the one or more embodiments). All descriptions, embodiments, and the like are exemplary in nature and place no limitations on any embodiment described or anticipated herein.

A series of experiments were conducted utilizing a dataset of mated and non-mated facial images. The mated facial images and the non-mated facial images each included a first subset of images with face coverings and a second subset of images without face coverings. Comparisons were performed to generate distance scores that were subjected to one or more calibrations described herein.

An experiment was conducted with 2450 face images with face coverings and 2402 face images without face coverings. The Equal Error Rate (EER) of the face covering detection process was 0.12%. The score distribution on samples with face coverings peaked at about 0.02 and the score distribution on samples without face covering peaked at about 0.98. Exemplary results of the calibrations are represented in FIGS. 5-8.

The images were divided into four disjoint partitions, as shown below. The experiment excluded 196 images because the associated individuals did not have exactly 8 samples without face covering (e.g., the qualifying criteria for sample selection for use in this experiment). Table 3 summarizes the experimental data.

| Enrollment image with face cover | Enrollment image without face cover | Probe image with face cover | Probe image without face cover | Total Number of Samples |
|---|---|---|---|---|
| FALSE | FALSE | FALSE | FALSE | 196 |
| FALSE | FALSE | FALSE | TRUE | 1764 |
| FALSE | FALSE | TRUE | FALSE | 1731 |
| FALSE | TRUE | FALSE | FALSE | 588 |
| TRUE | FALSE | FALSE | FALSE | 573 |

Figure 6:
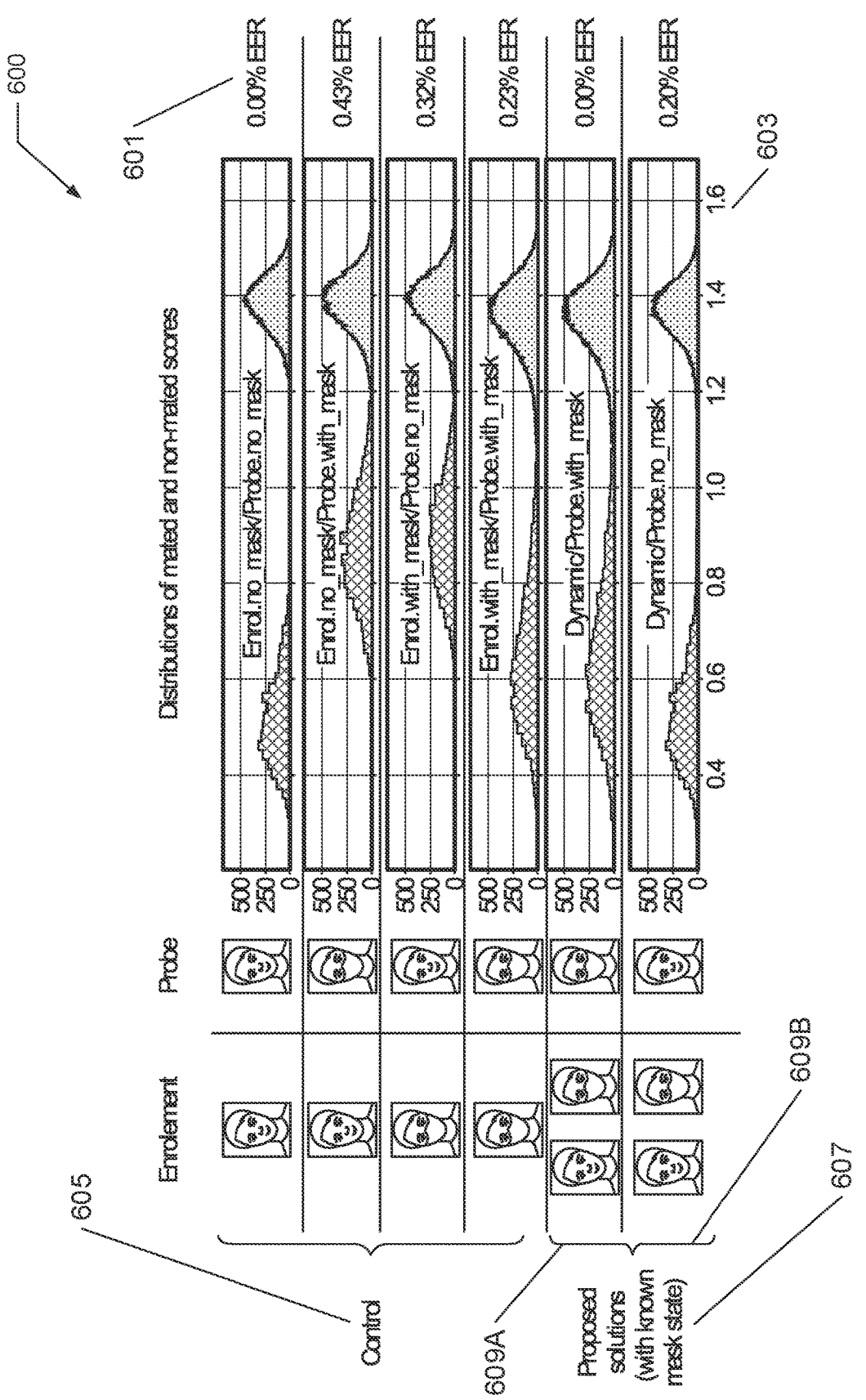

The comparison and calibration experiment resulted in 3396-3528 mated scores and 988467-1033704 non-mated scores, giving rise to EER values shown in the FIG. 6.

Table 4 shows EER values from experimental comparisons in which the mask state must be inferred from the probe image. The last column of Table 4 shows the domain of the similarity score, which could be a distance [D] or calibrated probability [P]. In the calibrated probability, it can be observed that the mean mated score after calibration is close to 0.2 whereas the mean non-mated score after calibration is around 0.8.

TABLE 4

Comparison Results

| Row Labels | EER (%) | mean mated_ scores | mean non-mated_ scores | type |
|---|---|---|---|---|
| Dynamic\|Probe.no_mask | 0.00% | 0.5193 | 1.3692 | D |
| Dynamic\|Probe.no_mask\|method 2 | 0.00% | 0.7912 | 0.2034 | P |
| Dynamic\|Probe.no_mask\|method 6 | 0.00% | 0.7912 | 0.2034 | P |
| Dynamic\|Probe.with_mask | 0.20% | 0.6454 | 1.3539 | D |
| Dynamic\|Probe.with_mask\|method 2 | 0.18% | 0.7851 | 0.2065 | P |
| Dynamic\|Probe.with_mask\|method 6 | 0.18% | 0.7851 | 0.2065 | P |
| Enrol.no_mask\|Probe.no_mask | 0.00% | 0.5193 | 1.3850 | D |
| Enrol.no_mask\|Probe.with_mask | 0.43% | 0.8758 | 1.3863 | D |
| Enrol.with_mask\|Probe.no_mask | 0.32% | 0.9005 | 1.3868 | D |
| Enrol.with_mask\|Probe.with_mask | 0.23% | 0.6435 | 1.3576 | D |

Under the mismatched condition, where one side of the image has a face covering and another side does not, the EER is 0.43% and 0.32%. The proposed dynamic solution has an EER of 0% when the probe image does not have a face covering and 0.18% when the probe image has a face covering. The latter value is superior to the two scenarios with mismatched conditions. In terms of usage, the biometric system operator may set the similarity threshold threshold to 0.5, regardless of whether the probe image has a face covering or not.

Figure 5:
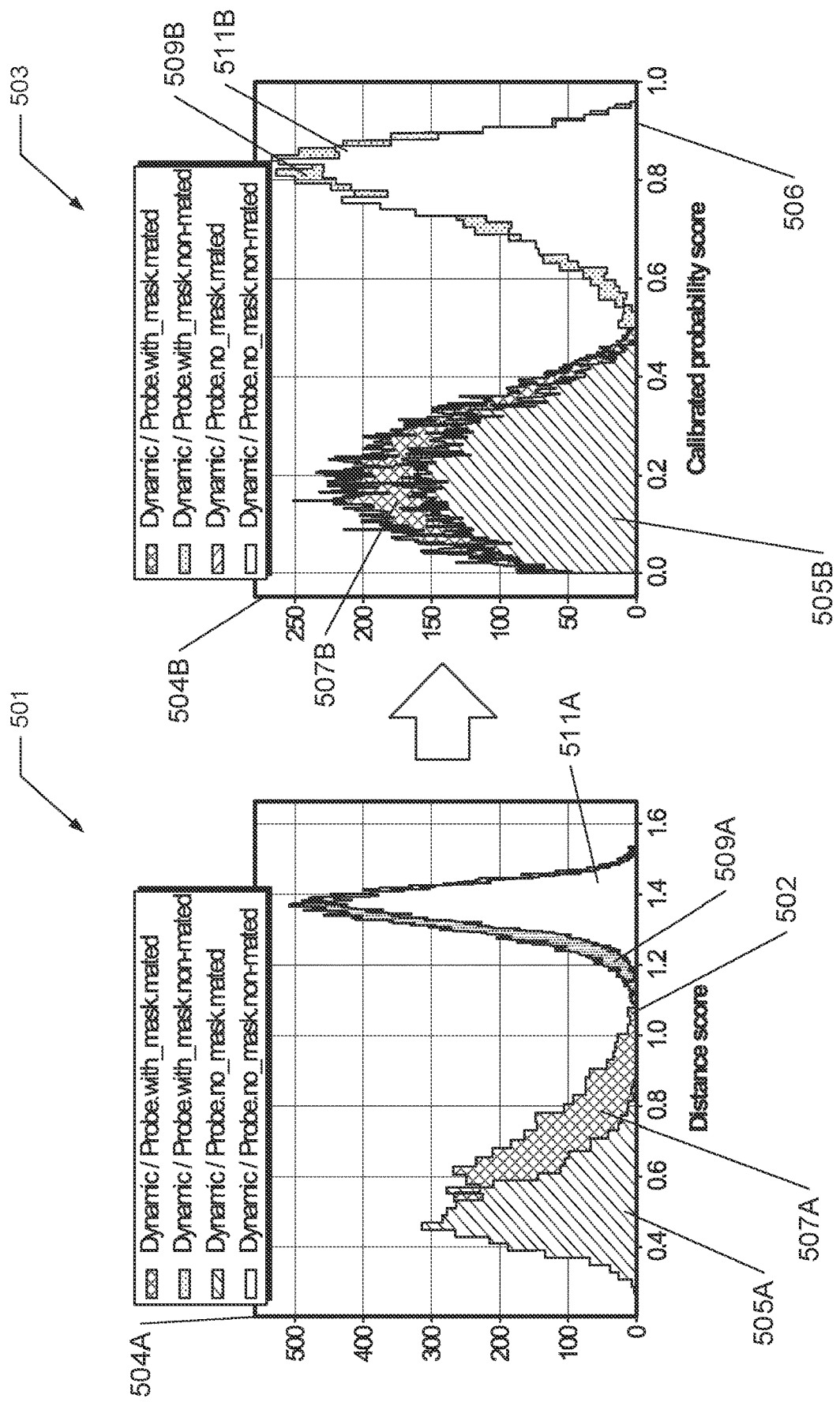
FIGS. 5-8 are charts of exemplary biometric matching performance, according to one embodiment of the present disclosure.

FIG. 5 shows charts 501, 503 that describe face covered and face uncovered mated distributions 505A-B, 507A-B of similarity scores expressed as a distance score 502 or as a calibrated probability score 506, and that describe face covered and face uncovered non-mated distributions 509A-D and 511A-B of similarity scores expressed as the distance score 502 or as the calibrated probability score 506. According to one embodiment, the charts 501, 503 demonstrate effects of a calibration process performed on distance scores represented in chart 501 to generate calibrated probability scores represented in chart 503. In various embodiments, the calibration process represented in FIG. 5 is performed according to Equation 2. In at least one embodiment, the chart 503 demonstrates that an effective EER operating threshold may be configured at a calibrated probability value of about 0.5. In one or more embodiments, the face covered and face uncovered mated distributions 505A-B, 507A-B demonstrate a leftward shift following calibration, and the face covered and faced uncovered non-mated distributions 509A-B, 511A-B demonstrate a rightward shift following calibration. According to one embodiment, the opposing shifts of the mated and non-mated distributions demonstrating the efficacy of the present calibration techniques in improving specificity and accuracy of biometric matching processes.

FIG. 6 shows a chart 600 that demonstrates similarity score distributions obtained from the experiment and classified into a control group 605 and an experimental group 607. According to one embodiment, score distributions of the control group 605 were not calibrated and score distributions of the experimental group 607 were calibrated. In at least one embodiment, similarity scores of an experimental score distribution 609A were calibrated according to Equation 2 and similarity scores of an experimental score distribution 609B were calibrated according to Equation 5. In at least one embodiment, the chart 600 expresses similarity score as a probability score 603 and includes an EER value 601 that measures an accuracy of biometric matching performed with each image group defined in Table 3. In one or more embodiments, the experimental score distributions 609A-B each demonstrate greater separation in mated and non-mated similarity scores as compared to the distributions of the control group 605, thereby demonstrating the efficacy of calibration techniques described herein.

Figure 7:
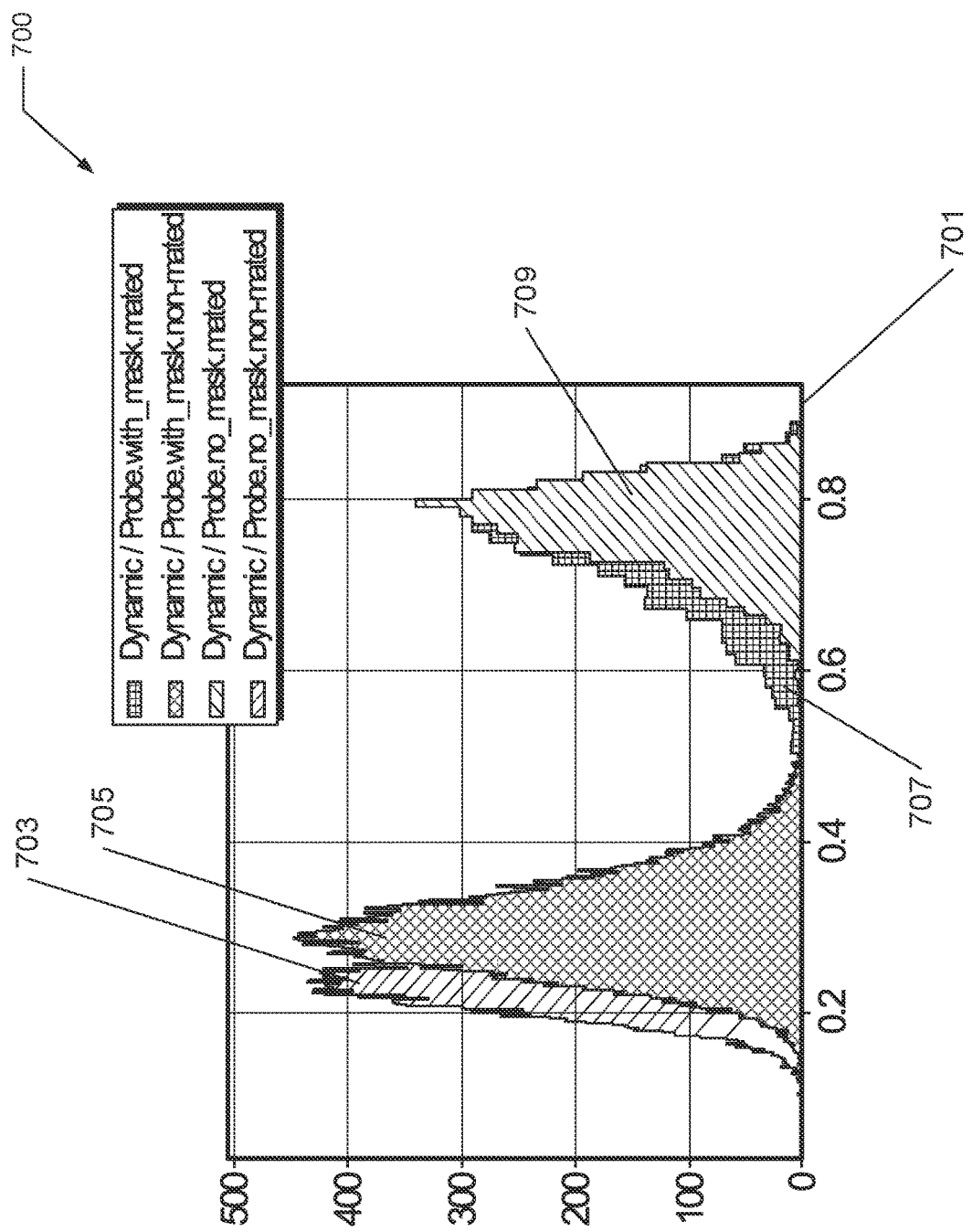

FIG. 7 shows a chart 700 that describes face covered and face uncovered non-mated distributions 703, 705 of similarity scores expressed as a calibrated probability score 701, and that describes face covered and face uncovered mated distributions 707, 709 of similarity scores expressed as the calibrated probability score 701. In at least one embodiment, the non-mated, face covered distribution 705 experiences a rightward shift and the mated, face covered distribution 707 experiences a leftward following calibration performed according to the EER operating point. In at least one embodiment, the chart 700 indicates that an optimal similarity threshold for controlling verification and identification determinations based on calibrated similarity scores may be a probability score of about 0.5.

Figure 8:
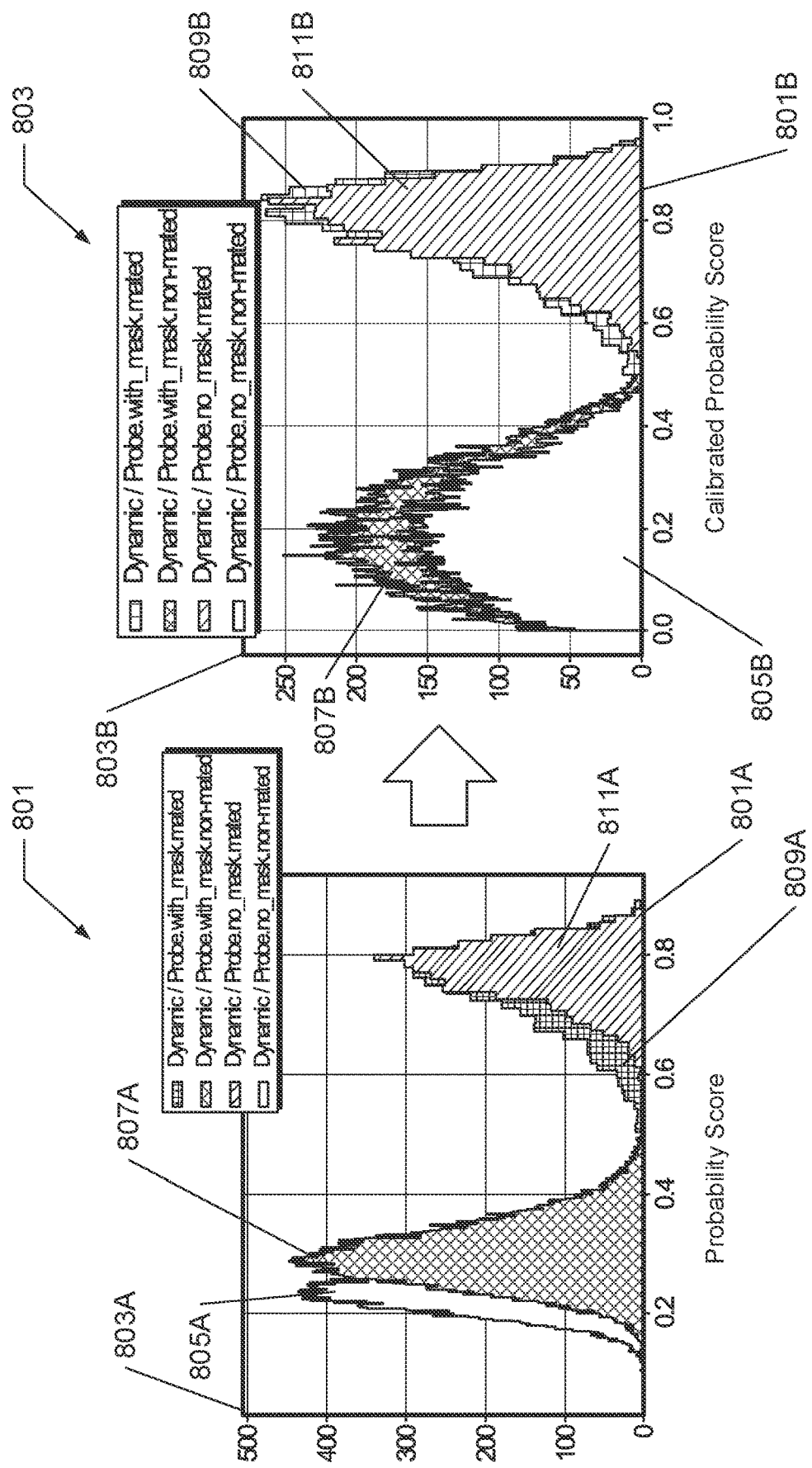

FIG. 8 shows charts 801, 803 that describe face covered and face uncovered mated distributions 805A-B, 807A-B of similarity scores expressed as a calibrated probability score 801A-B, and that describe face covered and face uncovered non-mated distributions 809A-D and 811A-B of similarity scores expressed the calibrated probability score 801A-B. According to one embodiment, the charts 801, 803 demonstrate effects of a calibration process performed on probability scores represented in chart 801 to generate calibrated probability scores represented in chart 803. In various embodiments, the calibration process represented in FIG. 8 is performed according to Equation 1. In at least one embodiment, the chart 803 demonstrates that an effective operating threshold for similarity may be configured at a calibrated probability value of about 0.5. In one or more embodiments, the face covered and face uncovered mated distributions 805A-B, 807A-B demonstrate a leftward shift following calibration, and the face covered and faced uncovered non-mated distributions 809A-B, 811A-B demonstrate a rightward shift following calibration. According to one embodiment, the opposing shifts of the mated and non-mated distributions demonstrating the efficacy of the present calibration techniques in improving specificity and accuracy of biometric matching processes.

Additional Description of Exemplary Embodiments

Finger-Based Authentication

In one or more embodiments, a biometric solution for individuals wearing face coverings includes generating and storing biometric representations of the subject that may be retrieved for subsequent biometric matching processes without requiring the individual to remove a face covering. In one or more embodiments, the biometric representations are authenticated using multimodal biometric images privately captured by the individual (e.g., thereby allowing for removal of a face covering). According to one embodiment, the biometric solution includes, but is not limited to, receiving a facial biometric capture from an individual, the facial biometric capture being obtained by the individual taking a photo of themselves in private. In one or more embodiments, the facial biometric capture is temporarily stored on a computing device of the individual. For example, the individual uses their mobile device to take a "private selfie" of their face and the image is temporarily stored in a cache of the mobile device. In various embodiments, the individual captures an image of an identity document (e.g., a passport, license, national ID card, etc.) including a facial image of the individual. In at least one embodiment, identity data is generated from the identity document by one or more techniques including, but not limited to, optical character recognition (OCR) and reading of machine-readable data from the identity document image. In some embodiments, the identity document includes an embedded chip or other storage media (such as a magnetic stripe) that encodes a facial image of the individual, and the individual uses their computing device to read and extract the stored identity data and obtain the facial image.

In one or more embodiments, the identity data and the facial biometric capture are compared and a similarity metric is generated. For example, a Euclidean distance metric is computed between the facial image of the identity data and the facial biometric capture. In at least one embodiment, the similarity metric is compared to a predetermined threshold and, upon determining the similarity metric satisfies the threshold, the identity of the individual is verified.

According to one embodiment, following identity verification, the individual captures a multimodal biometric image including the individual's face and at least one hand held palm-forward beside the individual's face. In one or more embodiments, the individual captures a second image (referred to as a "feature image") of the palm side of the at least one hand. In some embodiments, an image capture application running on the individual's computing device generates a template, wherein the individual is instructed to align the at least one hand within the template before initiating feature image capture. In alternate embodiments, the feature image is captured and is processed to align the feature image to a stored template.

In one or more embodiments, the feature image and multimodal biometric image are compared and a similarity metric is computed. According to one embodiment, the similarity metric is compared to a similarity threshold. In various embodiments, upon determining that the similarity metric satisfies the similarity threshold, the feature image is saved as a biometric representation of the individual and the multimodal biometric image and facial biometric capture are deleted from the temporary storage. In one or more embodiments, the feature image and the earlier extracted identification data are stored on the individual's computing device or are uploaded to a remote server that stores the feature image and identification data.

The following section provides an exemplary scenario of biometric enrollment of a subject using one embodiment of the preceding process.

1. A woman enrolls in a non-public setting (e.g., allowing removal of a face covering) using a facial biometric capture that is temporarily stored on the woman's device ("the private selfie").
2. The woman captures an image of her identity document and the facial image on the document is compared to the private selfie.
3. The identity data from the identity document is captured using OCR and/or through reading any machine-readable data and/or reading data stored on any embedded chip or other storage media including any magnetic strip "the verified identity."
4. If the identity document facial image and the private selfie match, the woman captures a "multi-modal private selfie" being her face with her hand help up beside it in the same image.
5. The woman then captures an image of her hand ("the hand feature image") which is framed within a template displayed on the device screen.
6. The hand image is compared to the multi-modal private selfie and if the fingers match, the private selfie and multi-model private selfie are deleted from her device and the hand image is saved on the device and/or in a cloud application against the verified identity allowing future authentication without having to reveal the woman's face.

Eye-Based Authentication

In at least one embodiment, one or more initial steps of eye-based authentication are similar to those performed for finger-based authentication. In one or more embodiments, an individual's identity is first verified based on a comparison between a privately captured facial image and identity data (e.g., a facial image extracted therefrom). According to one embodiment, following identity verification, the individual captures a multimodal biometric image including the individual's face and, in particular, the individual's eyes. In some embodiments, an image capture application running on the individual's computing device generates a template, wherein the individual is instructed to align their eyes within the template before initiating multimodal biometric image capture.

In alternate embodiments, the captured facial image is cropped such that only a portion of the image including the individuals' eyes is retained. In some embodiments, if the cropped eye image is determined to be of a sufficient resolution, the cropped eye image is stored as a biometric representation of the individual (e.g., as an authenticated feature image) and the captured facial image is deleted from temporary storage. In at least one embodiment, the identity data (or at least a facial image extracted therefrom) are also stored.

In one or more embodiments, the eye image and the privately captured facial image are compared and a similarity metric is computed. According to one embodiment, the similarity metric is compared to a similarity threshold. In various embodiments, upon determining that the similarity metric satisfies the similarity threshold, the eye image is saved as a biometric representation of the individual and the privately captured facial image is deleted from the temporary storage. In one or more embodiments, the eye image and the earlier extracted identification data are stored on the individual's computing device and/or are uploaded to a remote server that stores the feature image and identification data.

The following section provides an exemplary scenario of biometric enrollment of a subject using one embodiment of the preceding process.

1. The woman enrolls in private using a facial biometric capture that is temporarily stored on the woman's device ("the private selfie")
2. The woman captures an image of her identity document and the facial image on the document is compared to the private selfie
3. The identity data from the identity document is captured using OCR and/or through reading any machine-readable data and/or reading data stored on any embedded chip or other storage media including any magnetic strip "the verified identity"
4. If the identity document facial image and the private selfie match, the woman captures an image of her eyes ("the eye feature image") which is framed within a template displayed on the device screen. Alternately, if the woman's eyes are sufficiently clear in the private selfie to be used for biometric authentication then the private selfie image is cropped so that only the part of the private selfie image that shows the eyes is retained and the original private selfie is deleted.
5. The eye image is compared to the private selfie and if the eyes match, the private selfie is deleted from her device and the eye image is saved on the device and/or in a cloud application against the verified identity allowing future authentication without having to reveal the woman's face.

Figure 9:
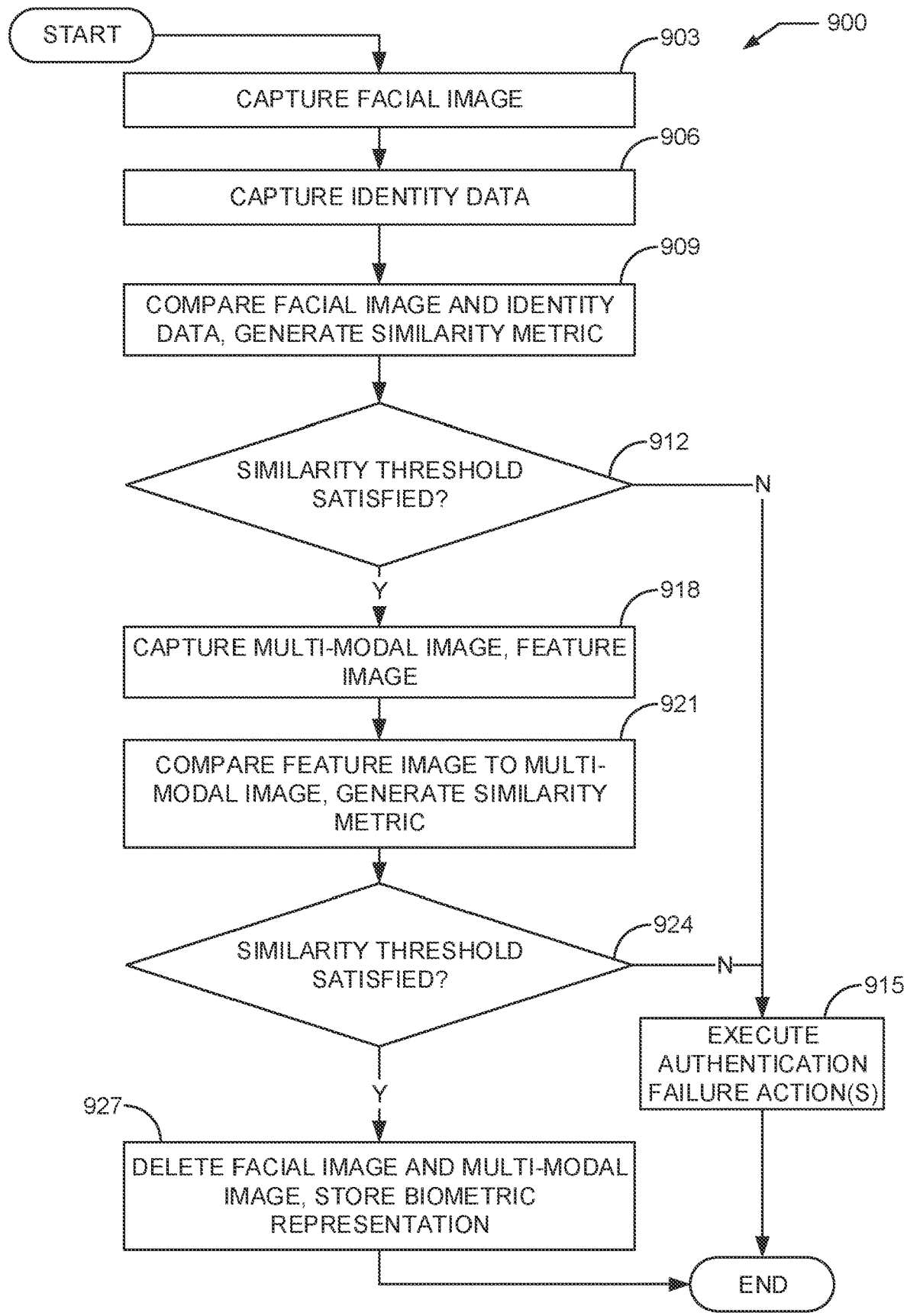
FIG. 9 is a flowchart of an exemplary biometric enrollment process, according to one embodiment of the present disclosure.

FIG. 9 is a flowchart of an exemplary biometric enrollment process 200 according to one embodiment.

At step 903, a facial image is captured, for example, by the capture system 112. In one or more embodiments, the facial image is captured in a non-public setting thereby allowing an individual to remove a face covering. According to one embodiment, the facial image is temporarily stored in the cache 110. In one or more embodiments, the facial image is transmitted to the computing environment 101, for example, to the analysis module 103 thereof. In some embodiments, the facial image is temporarily stored in enrollment data 107.

At step 906, identity data is extracted from one or more identity documents. In various embodiments, the capture system 112 captures an image of each of the one or more identity documents. In one or more embodiments, the one or more identity document images are processed by the image application or the analysis module 103 to extract the identity data. In at least one embodiment, the extracted identity data includes a facial image, such as, for example, an ID photo. In some embodiments, the facial image is extracted from the identity data by one or more techniques including, but not limited to, optical character recognition (OCR), processing of machine-readable data such as a QR code, and other techniques.

At step 909, the facial image of step 903 is compared to the facial image extracted from the identity data and a similarity score is generated. In one or more embodiments, the comparison includes computing a similarity score, such as a Euclidean distance metric or $L^2$ norm metric. In various embodiments, the comparison is performed by the analysis module 103. In some embodiments, the comparison is performed by the image application 113. The computed similarity score may be stored in the data store 105 or cache 110.

At step 912, the similarity score is compared to a similarity threshold. The similarity threshold may be a threshold value retrieved from thresholds 109. According to one embodiment, if the similarity score is determined to meet or exceed the threshold value, the process 900 proceeds to step 918. In one or more embodiments, if the similarity score is determined not to meet or exceed the threshold value, the process 900 proceeds to step 915 or, in some embodiments, is suspended entirely.

At step 915, one or more actions are executed based on a failure to authenticate the individual's identity or failure to enroll the biometric information of the individual. In various embodiments, the one or more actions include, but are not limited to, sending a notification to the computing environment 101 (or one or more administrators thereof), rendering a notification on a display of the computing device 106, storing the facial image of step 202 and the identity data in the data store 105, and other suitable actions and combinations thereof.

At step 918, a multimodal image and a feature image are captured. In some embodiments, only the multimodal image is captured. In one example, if one or more biometric features of the multimodal image are of a sufficient clarity or resolution, the capture of the feature image is not performed. In various embodiments, the multimodal image includes the individual's uncovered face and, in some embodiments, one or more biometric features positioned near the face. In one example, the image application 113 renders instructions on a display of the computing device 106 indicating that the individual is to position one of their hands, palm-forward, near their face and capture the face and hand as the multimodal image. In one or more embodiments, the feature image includes only the one or more biometric features. Continuing the above example, the feature image only includes the hand, palm-side up, that was positioned near the face during multimodal image capture. In at least one embodiment, the image application 113 retrieves a template 111 and renders the template 111 on a display of the computing device 106. According to one embodiment, the rendered template 111 provides the individual with a visual instruction for properly aligning the one or more biometric features in the feature image. In one or embodiments, the multimodal image and/or feature image are stored in the cache 110, storage 114, and/or the data store 105.

At step 921, the multimodal image is compared to the feature image. In one or more embodiments, the comparison includes computing a similarity score, such as a Euclidean distance metric or $L^2$ norm metric. In various embodiments, the comparison is performed by the analysis module 103. In some embodiments, the comparison is performed by the image application 113. The computed similarity score may be stored in the data store 105 or cache 110.

In alternate embodiments, upon determining that the multimodal image is of sufficient resolution, the multimodal image is cropped to include only one or more biometric features, and the cropped image is stored as described at step 218.

At step 924, the similarity score is compared to a similarity threshold. The similarity threshold may be a threshold value retrieved from thresholds 109. According to one embodiment, if the similarity score is determined to meet or exceed the threshold value, the process 900 proceeds to step 927. In one or more embodiments, if the similarity score is determined not to meet or exceed the threshold value, the process 900 moves to step 915 or, in some embodiments, is suspended entirely.

At step 927, the feature image or the cropped image of the multimodal image is stored as a biometric representation of the individual, and the facial image of step 903 and the multimodal image are purged from the cache 110 (e.g., and any other locations storing the same). According to one embodiment, the identity data (e.g., or at least a facial image extracted therefrom) is stored along with the biometric representation. In at least one embodiment, the biometric representation and identity data are stored in enrollment data 114 and/or in the storage 114 of the computing device 106. In various embodiments, in future biometric identification or verification processes involving the individual, the biometric representation is retrieved and compared to a live image capture of the one or more biometric features included in the biometric representation. In various embodiments, because the biometric representation has been previously authenticated with the individual's face, the individual only reveals the one or more biometric features and may not be required to remove a face covering. In one or more embodiments, the image application 113 renders a notification on the computing device 106 display indicating the successful enrollment of the individual into the biometric system.

Aspects, features, and benefits of the systems and processes discussed herein will become apparent from the information disclosed in the exhibits and the other applications as incorporated by reference. Variations and modifications to the disclosed systems and processes may be effected without departing from the spirit and scope of the novel concepts of the disclosure. It will, nevertheless, be understood that no limitation of the scope of the disclosure is intended by the information disclosed in the figures or the applications incorporated by reference; any alterations and further modifications of the described or illustrated embodiments, and any further applications of the principles of the disclosure as illustrated therein are contemplated as would normally occur to one skilled in the art to which the disclosure relates.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A method, comprising:
   receiving an uncovered face image of a subject;
   generating a first fixed-size representation (FXR) based on the uncovered face image;
   generating a covered face image of the subject based on the uncovered face image by at least:
   generating a head pose estimation of the subject based on the uncovered face image; and fitting a 3-D virtual face covering to the uncovered face image of the subject based on the head pose estimation, wherein the covered face image of the subject comprises an artificial representation of a face covering, the face covering being a face mask;
   generating a second FXR based on the covered face image; and
   creating a record of the first FXR and the second FXR in association with the subject.

2. The method of claim 1, further comprising:
   receiving a second face image of a second subject;
   determining a mask probability based on the second face image;
   generating a third FXR based on the second face image;
   retrieving the first FXR and the second FXR;
   generating:
   a first similarity score by comparing the third FXR to the first FXR; and
   a second similarity score by comparing the third FXR to the second FXR;
   calibrating the first similarity score and the second similarity score based on the mask probability to generate a third similarity score;
   determining that the third similarity score satisfies a predetermined threshold; and
   verifying that the second subject and the subject are the same based on the determination.

3. The method of claim 2, further comprising providing the second subject access to a digital environment or restricted area based on the verification.

4. The method of claim 1, further comprising:
receiving a second face image of a second subject;
determining a mask probability based on the second face image;
generating a third FXR based on the second face image;
generating a plurality of similarity scores based on comparisons between the third FXR and a plurality of paired FXRs, wherein a particular pair of the plurality of paired FXRs comprises the first FXR and the second FXR;
calibrating each of the plurality of similarity scores based on the mask probability to generate a plurality of calibrated similarity scores;
determining a top-ranked calibrated similarity score from the plurality of calibrated similarity scores, wherein the top-ranked calibrated similarity score was derived from the comparison between the third FXR and the particular pair of the plurality of paired FXRs; and
determining that the second subject and the subject are the same based on a determination that the top-ranked calibrated similarity score meets a predetermined threshold.

5. The method of claim 4, further comprising transmitting an alert to a computing device based on the determination that the second subject and the subject are the same.

6. The method of claim 4, wherein each of the pairs of the plurality of paired FXRs comprises a covered face FXR and an uncovered face FXR.

7. A method, comprising:
receiving an uncovered face image of a subject;
generating a first fixed-size representation (FXR) based on the uncovered face image;
generating a covered face image of the subject based on the uncovered face image by at least:
detecting, via a face detection algorithm, a face, a nose, and a mouth of the subject within the uncovered face image;
generating a cropped face image by cropping the face from the uncovered face image according to a normalized coordinate set;
aligning, via an image warping technique, the cropped face image according to the normalized coordinate set; and
fitting a 3-D virtual face covering to the cropped face image such that the 3-D virtual face covering covers the nose and the mouth of the subject;
generating a second FXR based on the covered face image; and
creating a record of the first FXR and the second FXR in association with the subject.

8. The method of claim 7, further comprising detecting, via the face detection algorithm, a pair of eyes within the uncovered face image, wherein:
generating a covered face image of the subject further comprises generating a second cropped face image by aligning, via the image warping technique, the pair of eyes in the cropped face image according to a second normalized coordinate set; and
the step of fitting the 3-D virtual face covering is performed on the second cropped face image.

9. The method of claim 8, wherein the second normalized coordinate set comprises a left eye center coordinate and a right eye center coordinate.

10. The method of claim 9, wherein the second normalized coordinate set comprises a nose coordinate.

11. The method of claim 10, wherein the second normalized coordinate set comprises a first corner mouth coordinate and a second corner mouth coordinate.

12. A method for biometric verification, comprising:
receiving an image of a subject, wherein the image comprises a face;
determining a mask probability based on the image;
generating a first FXR based on the image;
retrieving a second FXR and a third FXR;
generating:
a first similarity score by comparing the first FXR and the second FXR; and
a second similarity score by comparing the first FXR and the third FXR;
calibrating the first similarity score and the second similarity score based on the mask probability to generate a third similarity score, wherein calibrating the first similarity score and the second similarity score comprises computing a log-likelihood ratio, and wherein the third similarity score comprises the log-likelihood ratio;
determining that the third similarity score satisfies a predetermined threshold; and
verifying that the second subject and the subject are the same based on the determination.

13. The method of claim 12, further comprising:
detecting the face in the image; and
generating a cropped facial image of the face, wherein:
determining the mask probability comprises applying a trained machine learning model to the cropped facial image to generate a posterior probability that the cropped facial image includes a face covering over the face; and
the mask probability comprises the posterior probability.

14. The method of claim 13, wherein the trained machine learning model is a convolutional neural network.

15. The method of claim 14, wherein:
the convolutional neural network was trained using a training dataset comprising a plurality of cropped facial images; and
the plurality of cropped facial images comprises:
a first subset comprising cropped covered facial images; and
a second subset comprising cropped uncovered facial images, wherein the second subset excludes the first subset.

16. The method of claim 12, wherein:
calibrating the first similarity score and the second similarity score comprises computing a direct posterior probability estimation; and
the third similarity score comprises the direct posterior probability estimation.

17. A system for biometric verification, comprising a server having a processor configured to:
receive an image of a subject, wherein the image comprises a face;
determine a mask probability based on the image;
generate a first FXR based on the image;
retrieve a second FXR and a third FXR;
generate:
a first similarity score by comparing the first FXR and the second FXR; and
a second similarity score by comparing the first FXR and the third FXR;

calibrate the first similarity score and the second similarity score based on the mask probability to generate a third similarity score, wherein calibrating the first similarity score and the second similarity score comprises computing a log-likelihood ratio, and wherein the third similarity score comprises the log-likelihood ratio;

determine that the third similarity score satisfies a predetermined threshold; and verify that the second subject and the subject are the same based on the determination.

18. The system of claim 17, wherein the processor is further configured to:

detect the face in the image; and generate a cropped facial image of the face, wherein:

determining the mask probability comprises applying a trained machine learning model to the cropped facial image to generate a posterior probability that the cropped facial image includes a face covering over the face; and the mask probability comprises the posterior probability.

19. The system of claim 18, wherein the trained machine learning model is a convolutional neural network.

20. The system of claim 19, wherein:

the convolutional neural network was trained using a training dataset comprising a plurality of cropped facial images; and the plurality of cropped facial images comprises:

a first subset comprising cropped covered facial images; and a second subset comprising cropped uncovered facial images, wherein the second subset excludes the first subset.

* * * * *